United States Patent
Walker et al.

(10) Patent No.: US 9,264,481 B2
(45) Date of Patent: Feb. 16, 2016

(54) RESPONDING TO HYPERTEXT TRANSFER PROTOCOL (HTTP) REQUESTS

(71) Applicant: QUALCOMM Incorporated, San Diego, CA (US)

(72) Inventors: Gordon Kent Walker, Poway, CA (US); Michael G. Luby, Berkeley, CA (US); Nagaraju Naik, San Diego, CA (US); Jack S. Shauh, San Diego, CA (US); Kuo-Chun Lee, San Diego, CA (US); Yinian Mao, San Diego, CA (US); Thomas Stockhammer, Bergen (DE); Charles N. Lo, San Diego, CA (US); Kevin R. Fall, Pittsburgh, PA (US)

(73) Assignee: QUALCOMM Incorporated, San Diego, CA (US)

( * ) Notice: Subject to any disclaimer, the term of this patent is extended or adjusted under 35 U.S.C. 154(b) by 281 days.

(21) Appl. No.: 13/838,744

(22) Filed: Mar. 15, 2013

(65) Prior Publication Data

US 2013/0262567 A1 Oct. 3, 2013

Related U.S. Application Data

(60) Provisional application No. 61/618,367, filed on Mar. 30, 2012, provisional application No. 61/679,628, filed on Aug. 3, 2012.

(51) Int. Cl.
*G06F 15/16* (2006.01)
*H04L 29/08* (2006.01)
*G06F 17/30* (2006.01)

(52) U.S. Cl.
CPC .......... *H04L 67/06* (2013.01); *G06F 17/30899* (2013.01); *H04L 67/02* (2013.01); *H04L 69/329* (2013.01)

(58) Field of Classification Search
CPC .............................. H04L 67/02; H04L 69/329
USPC ......................................... 709/231, 232, 236
See application file for complete search history.

(56) References Cited

U.S. PATENT DOCUMENTS

| | | | |
|---|---|---|---|
| 6,199,107 B1 * | 3/2001 | Dujari | G06F 17/30902 707/E17.12 |
| 8,161,472 B2 | 4/2012 | Hayton et al. | |
| 8,230,224 B2 | 7/2012 | Chakraborty | |
| 8,271,689 B2 | 9/2012 | Bannoura et al. | |
| 2005/0144278 A1 * | 6/2005 | Atamaniouk | H04L 67/02 709/225 |
| 2005/0187959 A1 | 8/2005 | Jung et al. | |
| 2006/0023652 A1 * | 2/2006 | Vedantham et al. | 370/312 |

(Continued)

FOREIGN PATENT DOCUMENTS

| | | |
|---|---|---|
| EP | 1679620 A1 | 7/2006 |
| KR | 20100014088 A | 2/2010 |

OTHER PUBLICATIONS

International Search Report and Written Opinion—PCT/US2013/034608—ISA/EPO—Jun. 26, 2013.

*Primary Examiner* — Hieu Hoang
(74) *Attorney, Agent, or Firm* — Ryan N. Farr

(57) ABSTRACT

Embodiments enable HTTP servers to pass incomplete and/or corrupted files in response to file requests from clients. In the various embodiments, HTTP servers may be enabled to generate status codes identifying that an incomplete version of a file is being returned in response to a file request. In an embodiment, an HTTP server may be enabled to determine the ability of a client to handle incomplete versions of files.

32 Claims, 18 Drawing Sheets

(56) References Cited

U.S. PATENT DOCUMENTS

2006/0236387 A1* 10/2006 Ballinger et al. .............. 726/14
2008/0168359 A1* 7/2008 Flick et al. .................... 715/748
2009/0254707 A1* 10/2009 Alstad .......................... 711/118
2009/0307304 A1 12/2009 Moldenhauer et al.
2012/0096083 A1* 4/2012 Teng ................... H04L 65/4084
　　　　　　　　　　　　　　　　　　　　　709/203
2012/0254926 A1* 10/2012 Takahashi et al. .............. 725/98

* cited by examiner

RESPONDING TO HYPERTEXT TRANSFER PROTOCOL (HTTP) REQUESTS

RELATED APPLICATIONS

This application claims the benefit of priority to U.S. Provisional Patent Application No. 61/618,367 entitled "Error Recovery Compatible File Delivery Over Unidirectional Transport (FLUTE) Interface" filed Mar. 30, 2012, and U.S. Provisional Patent Application No. 61/679,628 entitled "Error Recovery Compatible File Delivery Over Unidirectional Transport (FLUTE) Interface" filed Aug. 3, 2012, the entire contents of which are hereby incorporated by reference.

BACKGROUND

The File Delivery Over Unidirectional Transport (FLUTE) implements the file transport mechanism defined in Internet Engineering Task Force proposed standard Request for Comments (RFC) 3926 entitled "FLUTE—File Delivery over Unidirectional Transport," published October 2004, available at http://tools.ietf.org/html/rfc3926. As currently defined a FLUTE receiver only passes up complete files (i.e., files that do not begin with missing/corrupted data portions or file that do not have intermediate missing/corrupted data portions). Current FLUTE receivers/handlers/interfaces are not capable of discerning whether a partially received file fragment may be useful to a specific application and/or a specific client implementing all or part of that application, such as a Dynamic Adaptive Streaming Over Hypertext Transfer Protocol (DASH) client that may access the DASH formatted files delivered via FLUTE to play back media in such FLUTE delivered files. Currently, a FLUTE receiver is not enabled to parse files; a FLUTE receiver merely delivers files to applications and/or clients.

An application and/or a client providing inputs to a codec, such as a DASH client, may be enabled under certain conditions to recover and provide some portion of a file to the codec even though the file may not have been received by the application and/or client in its entirety. Because FLUTE receivers as currently defined cannot pass incomplete files up to an application, the functionality of applications and/or clients providing inputs to a codec which may be enabled to recover and playback partially received files may be reduced by the current limitations of a FLUTE interface serving those applications and/or clients. As an example, currently FLUTE receivers will simply discard incomplete and/or corrupted files received in broadcast and/or unicast communications, and the discarding of the incomplete and/or corrupted files may result in a DASH player receiving too few symbols for effective Forward Error Correction (FEC) to decode. As another example, discarding of incomplete and/or corrupted files by current FLUTE interfaces may result in a DASH player failing to receive enough data from a Transmission Control Protocol (TCP)/Internet Protocol (IP) connection before playback time. As a further example, discarding of incomplete and/or corrupted files by current FLUTE interfaces may result in a DASH player having a long gap, or long stall, in presenting media content because of lost content.

Incomplete file issues impact more than merely FLUTE interfaces. In the current Hypertext Transfer Protocol (HTTP) 1.1 defined in Internet Engineering Task Force proposed standard Request for Comments (RFC) 2616 entitled "Hypertext Transfer Protocol—HTTP/1.1" published June 1999, available at http://tools.ietf.org/html/rfc2616, there is no mechanism for servers to pass known incomplete versions of files (i.e., files that being with missing/corrupted data portions or files that have missing/corrupted data portions) to clients in response to file requests. In the current HTTP when a server receives a request for a file, or a partial file in the form of one or more byte ranges, such as a "GET" or "partial GET" method, and the server identifies the requested file or partial file is incomplete and/or corrupted, the server merely returns a message with an error status code, such as a message with a 404 "Not Found" status code. In the current HTTP, the incomplete and/or corrupted file is not sent to the requesting client. Because HTTP as currently defined cannot pass incomplete files to a client, the functionality of clients and/or applications enabled to recover and use partially received files may be reduced by current HTTP servers providing files to those clients and/or applications.

SUMMARY

The systems, methods, and devices of the various embodiments enable HTTP servers, such as HTTP servers associated with FLUTE receivers according to the various embodiments, to pass incomplete versions of files in response to file requests from clients. In the various embodiments, HTTP servers may be enabled to generate status codes identifying that an incomplete version of a file is being returned in response to a file request. In an embodiment, an HTTP server may be enabled to determine the ability of a client to handle incomplete versions of files. In another embodiment, an HTTP server may be enabled to generate headers identifying that an incomplete version of a file is being returned in response to a file request.

BRIEF DESCRIPTION OF THE DRAWINGS

The accompanying drawings, which are incorporated herein and constitute part of this specification, illustrate exemplary embodiments of the invention, and together with the general description given above and the detailed description given below, serve to explain the features of the invention.

DETAILED DESCRIPTION

Figure 1:
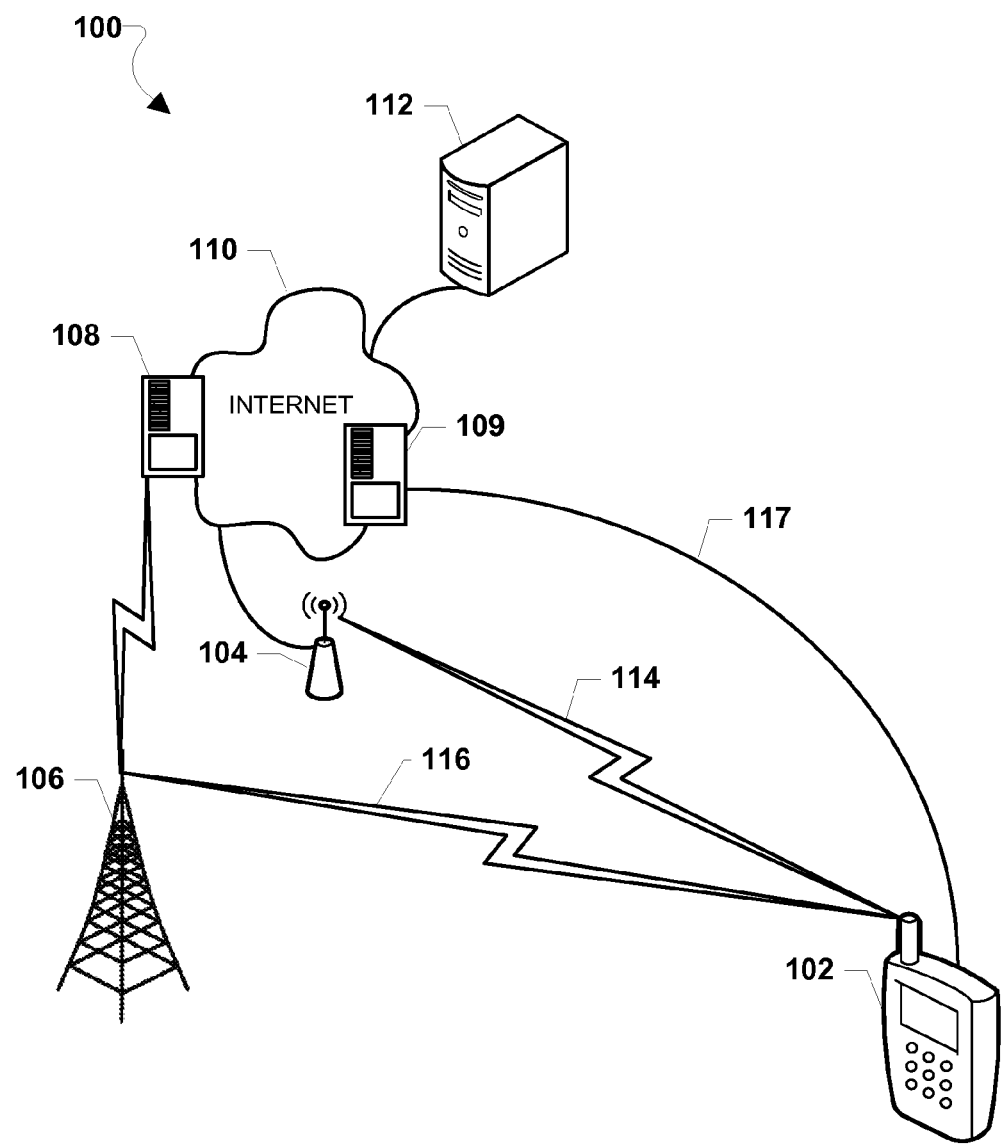
FIG. 1 is a communication system block diagram of a network suitable for use with the various embodiments.

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the invention or the claims.

The word "exemplary" is used herein to mean "serving as an example, instance, or illustration." Any implementation described herein as "exemplary" is not necessarily to be construed as preferred or advantageous over other implementations.

As used herein, the terms "mobile device", "receiver device", and "computing device" are used interchangeably herein to refer to any one or all of cellular telephones, smart phones, personal or mobile multi-media players, personal data assistants (PDAs), laptop computers, personal computers, tablet computers, smart books, palm-top computers, wireless electronic mail receivers, multimedia Internet enabled cellular telephones, wireless gaming controllers, and similar personal electronic devices which include a programmable processor and memory and circuitry for receiving files.

As used herein, the term "incomplete version of a file" is used to refer to an incomplete version of a file that has missing and/or corrupted data portions. For example, if a file comprises 1,000 bytes indexed by 0-999 then bytes 0-888 of that file is an incomplete version of that file, and bytes 500-999 is another incomplete version of that file, and bytes 0-200 together with bytes 300-999 is another incomplete version of that file, whereas bytes 0-999 is not an incomplete version of that file.

As used herein, the term "incomplete version of a byte range" is used to refer to an incomplete version of byte range of a file that has missing and/or corrupted data portions. For example, if a file comprises 1,000 bytes indexed by 0-999 then bytes 0-88 of that file is an incomplete version of the byte range 0-99 of that file, and bytes 50-99 is another incomplete version of the byte range 0-99 of that file, and bytes 0-20 together with bytes 30-99 is another incomplete version of the byte range 0-99 of that file, whereas bytes 0-99 is not an incomplete version of the byte range 0-99 of that file.

Currently, FLUTE receivers are not enabled to parse files; a FLUTE receiver merely delivers files to applications and/or clients by implementing the file transport mechanisms defined in Internet Engineering Task Force proposed standard RFC 3926 entitled "FLUTE—File Delivery over Unidirectional Transport," published October 2004, available at http://tools.ietf.org/html/rfc3926, which is hereby incorporated by reference in its entirety. In the current FLUTE protocol, video fragments or pieces are sent as individual files, called segments. In the current FLUTE protocol if the segment includes errors, current FLUTE receivers may discard the file. Currently FLUTE receivers may apply Forward Error Correction (FEC) to repair the segment, but if not enough repair symbols are present in the segment, a FLUTE receiver simply discards the file.

An application and/or a client providing inputs to a codec, such as a DASH client, may be enabled under certain conditions to recover and provide some portion of a file to a codec even though the file may not have been received by the application and/or client in its entirety, i.e., the application and/or client may be able to recover and provide an incomplete version of the file. Because FLUTE receivers as currently defined cannot pass up incomplete files, i.e., incomplete versions of files, to an application or client, the functionality of applications and/or clients providing inputs to a codec which may be enabled to recover and playback incomplete versions of files may be reduced by the current limitations of a FLUTE interface serving those applications and/or clients. As an example, FLUTE receivers, handlers, and/or interfaces as currently defined cannot pass incomplete versions of files to a DASH client. The inability to pass incomplete versions of files may reduce the end user playback experience. Thus, it may be useful if FLUTE receivers, handlers, and/or interfaces were enabled to deliver to a DASH client at least a portion of a file that may still be useful to the DASH client. The delivery of at least a portion of the incomplete version of a file may enable the DASH client to playback at least a portion of the media in the incomplete version of a file that may improve the end user media playback experience.

The various embodiments provide an enhanced FLUTE interface that may enable error recovery for applications and/or clients, such as a DASH client. In an embodiment, a computing device may be enabled to receive files over the Internet utilizing the enhanced FLUTE protocol. The computing device may receive files over the Internet utilizing an Internet Protocol (IP)/User Datagram Protocol (UDP) connection and, once received at the computing device, the enhanced FLUTE interface may place the files in a memory location visible to the target application(s) and/or client(s), such as a DASH client and/or DASH player. The target application may retrieve the file via a Uniform Resource Locator (URL) and/or Uniform Resource Identifier (URI) based on information in the Media Presentation Description (MPD), which is a piece of metadata that may be sent to a DASH client to notify the DASH client which media may be available for playback, and related information, such as different available rates at which the media may be presented, start and/or stop points of the media, information enabling the DASH client to switch from one media representation to another, memory locations where the media may be available, etc. As an example, a DASH client may retrieve the file via an HTTP "GET" operation (i.e., method). In an embodiment, the URL/URI of the desired file may be known by the application and/or client, such as a DASH client, based on a prior agreed naming convention. In an embodiment, enhanced FLUTE may assign a URL/URI that complies with the agreed naming convention to complete files and a modified URL/URI inconsistent with the agreed naming convention to incomplete versions of files. In this manner, the application and/or client, such as a DASH client and/or player, may receive the complete files with the compliant URLs/URIs and may ignore the incomplete versions of files with the modified URLs/URIs. In an embodiment, enhanced FLUTE may be enabled such that the incomplete versions of files with the modified URLs/URIs may remain stored in a memory of the computing device for a given but limited period of time, after which the incomplete versions of files may be deleted. In this manner, the computing device side server application/memory may not become cluttered with incomplete versions of files. In an embodiment, applications/clients enabled to play and/or repair incomplete versions of files, such as DASH client, may be enabled to exchange messages directly with the enhanced FLUTE to request and receive incomplete versions of files. In an embodiment, the applications/clients enabled to play and/or repair partially received files, such as a DASH client, may indicate via explicit inline signaling to the FLUTE layer, such as via header-based signaling in a HTTP "GET" operation (i.e., method) or other direct HTTP message, that they are enabled to play and/or repair incomplete versions of files. The enhanced FLUTE layer may receive the indication that the applications/clients, such as a DASH client, are enabled to utilize incomplete versions of files, and may provide incomplete versions of files to the applications/clients, such as DASH client. In an embodiment, enhanced FLUTE may also indicate in the response including the incomplete versions of files that the response includes the incomplete versions of files, such as via header-based signaling.

In an embodiment, applications and/or clients, such as a DASH client, may provide information about their capability to handle incomplete versions of files to enhanced FLUTE in a file request sent from the application and/or client to enhanced FLUTE. As an example, an application and/or client, such as a DASH client, enabled to handle incomplete versions of files may indicate it may accept incomplete versions of files in a file request. In an embodiment, an application and/or client, such as a DASH client, may be enabled to distinguish between URLs/URIs for completely and partially received files and may be enabled to utilize both conventional and modified URLs/URIs from enhanced FLUTE to retrieve complete and/or incomplete versions of files.

In an embodiment, enhanced FLUTE may supply incomplete versions of files to the application and/or client, such as a DASH client, according to a pre-agreed partial file naming convention. In an embodiment, the incomplete versions of files may contain all the correct source symbols, and/or any correctly received repair symbols. In another embodiment, enhanced FLUTE may provide two files, one which may include the correctly received symbols and one which may include a file of the repair symbols. In another embodiment, enhanced FLUTE may provide an incomplete version of a file containing a correct subset of all the transmitted source and/or repair symbols. In an embodiment in which the application and/or client, such as a DASH client, may have indicated incomplete version of a file handling capability while requesting the file, enhanced FLUTE may provide the incomplete version of a file with an incomplete version of a file indication in the response. In an embodiment, enhanced FLUTE may respond that a file is unavailable, such as "File Not Found," if an application and/or client has not indicated that it has incomplete version of a file handling capability while requesting the file. In an embodiment, the locations of the missing source data may be denoted by substitution codes and/or lists of byte ranges. In an embodiment, a list of byte ranges may be delivered as a portion of the source and/or repair files. In another embodiment, a list of byte ranges may be delivered separately from the source and/or repair files. In an embodiment, organization of the substitution codes and/or lists or byte ranges may be made according to a file naming convention, such that file naming may be utilize to signal which convention to follow for a given file. In an embodiment, file naming may utilize pre-defined extensions of the URL/URI.

In the various embodiments, the device side behaviors of applications and/or clients with an enhanced FLUTE interface may be categorized into three groups. In the various embodiments, a first group of applications and/or clients which may not be enabled to utilize incomplete versions of files and/or which may not be enabled with enhanced FLUTE may simply ignore the added/modified URLs/URIs and related files. In the various embodiments, a second group of applications and/or clients may be enabled to recognize the added/modified URLs/URIs and manage the use of incomplete versions of files based on the added/modified URLs/URIs. In an embodiment, the second group, for example an application and/or client, such as a DASH client, may be restricted to operating on a file only at the level that may be nominally visible at the added/modified URL layer. As an example, a DASH client may be aware of the Stream Access Points (SAP) via metadata, but the DASH client may not parse the underlying codec syntax. In this manner, the DASH client may be functionally limited to service resumption of video frames that are marked as SAP, and no codec specific behavior may be required. In the various embodiments, a third group of applications and/or clients may be enabled to seek and/or correct the missing and/or corrupted data in the incomplete versions of files identified by enhanced FLUTE. In an embodiment, the ability to seek and/or correct the missing and/or corrupted data may be application and/or client dependent. In a further embodiment, the ability to seek and/or correct the missing and/or corrupted data may be limited to predefined application methods, such as unicast repair. As an example, a DASH client may elect to attempt unicast file repair if the incomplete version of a file is of one type, such as On Demand type, but not attempt repair if the incomplete version of a file is of another type, such as Live type. In an embodiment, the determination to seek and/or correct the missing and/or corrupted data may be based on time limitations, size/scope of the missing and/or corrupted data, user defined settings, and/or network settings. In an embodiment, the third group of applications and/or clients may seek and/or correct the missing and/or corrupted data optionally based on unicast report back which may be accomplished by defined file report back methods and/or by the application and/or client. In an embodiment, the third group of applications and/or clients may seek and/or correct the missing and/or corrupted data optionally in response to delivery failure reporting, existing 3GPP methods, and/or application reporting. In another embodiment, the second or third group of applications and/or clients may also support rendering the content, such as a partial file playback, by various methods selected based on file type and/or temporal constraints.

Incomplete file issues impact more than merely FLUTE interfaces. In the current Hypertext Transfer Protocol (HTTP) 1.1 defined in Internet Engineering Task Force proposed standard Request for Comments (RFC) 2616 entitled "Hypertext Transfer Protocol—HTTP/1.1" published June 1999, available at http://tools.ietf.org/html/rfc2616, there is no mechanism for servers to provide incomplete version of a file responses (e.g., files that have missing/corrupted data portions) to clients in response to file requests. In greater detail, in the current HTTP, a client may generate a file request, such as a "GET" method, and send the file request to a server. File requests may be requests for a file associated with a URL/URI, and may be requests for the entire data contents of a file associated with a URL/URI (e.g., using a GET request that doesn't specify any byte range and thus requests the complete file) or may be requests for specific byte ranges of a file associated with a URL/URI (e.g., using a partial GET request that specifies a byte range within the complete file). In the current HTTP, a server can provide a "full response" or an error message, in response to a client's file request. The HTTP server will not provide incomplete versions of a file in response to HTTP client file requests. For GET requests that request a complete file, a full response from the HTTP server is the complete file, and an incomplete version of a file response is anything less than the complete file (e.g., an incomplete version of a file). For partial GET requests that specify a byte range, a full response from the HTTP server is the intersection between the complete file and the requested byte range, and an incomplete version of a byte range response is anything less than the intersection between the complete file and the requested byte range (e.g., an incomplete version of a byte range).

In particular, in the current HTTP, when a server receives a file request, the server may determine whether the file corresponding to the file request is fully available. As an example, the server may determine whether the file corresponding to the file request is incomplete and/or corrupted, such as missing data portions and/or including an indication that the file is incomplete and/or corrupted. As an example, the server may determine whether the file corresponding to the file request is incomplete and/or corrupted by determining whether FEC decoding was successful or unsuccessful. As another example, the server may determine whether the file corresponding to the file request is incomplete and/or corrupted by detecting a difference in a value of a received checksum, such as the MD5 digest, and a checksum computed by the FLUTE receiver. Those files which are not incomplete and/or corrupted may be determined by the server to be fully available and may be sent to the client in a "full response" that includes the requested file. In the current HTTP, upon identifying the requested file is not fully available (i.e., only an incomplete version of the file is available that has missing/corrupted data portions), the server merely returns a message with an error status code, such as a message with a 404 "Not Found" status code. Thus, in the current HTTP, the incomplete version of a file is not sent to the requesting client; that is, an "incomplete response" to a request for a file is not supported.

As mentioned above, the current HTTP also provides for partial GET requests, which specify a byte range for a requested file, and the full response to partial GET requests is the intersection between the complete file and the requested byte range. For example, in the current HTTP when an HTTP client sends a partial GET request for a byte range that extends beyond the end of a complete file, the full response that an HTTP server can provide is a sequential portion of bytes from the first byte in the requested byte range to the last byte of the complete file. Thus, in an example where the requested byte range is 0-100, but the complete file has only bytes 0-88, the full response is less than the byte range requested (in particular, bytes 0-88), but it is considered a "full response" nonetheless and may be sent by the HTTP server. However, in the current HTTP when an HTTP client sends a partial GET request and some of the bytes within the specified byte range are missing/corrupted, i.e., only an incomplete version of the byte range requested is available on the HTTP server, the HTTP server may not provide any portion of the requested bytes to the client and, instead, sends the client a message with an error status code. Thus, in an example where a requested byte range is 0-99, but only bytes 0-74 and 126-150 are available because bytes 75-125 are missing or corrupted, the current HTTP server will not send an incomplete version of the byte range response consisting of bytes 0-74 to the requesting client. Thus, in the current HTTP, the incomplete version of a byte range request is not sent to the requesting client; that is, an "incomplete response" to a request for a byte range of a file is not supported.

Because HTTP as currently defined does not pass incomplete responses to a client, the functionality of clients and/or applications which may be enabled to recover and use incomplete responses may be reduced because the clients and/or applications may never receive incomplete responses. Thus, it may be useful if HTTP servers were enabled to deliver to clients at least a portion of incomplete versions of files or incomplete versions of byte ranges of files that are available at the server. The delivery of at least a portion of the incomplete version of a file or byte range may enable client devices running an application and/or a client, such as a smart phone running a DASH client, to render the content, such as playing back at least a portion of the media in the incomplete version of a file or byte range, which may improve the end user media playback experience.

The features of the various embodiments may be described herein with reference to particular file requests (e.g., a request for a complete file) and particular incomplete responses (e.g., an incomplete version of a file). These features, however, may be used in connection with other file requests (e.g., requests for byte ranges of a file) and other incomplete responses (e.g., an incomplete version of a byte range of a file that consists of less than the intersection between the complete file and the requested byte range). Thus, the various embodiments may be applied to a variety of file requests and incomplete responses.

The various embodiments provide an enhanced HTTP server that may be configured to pass incomplete versions of files in response to file requests from client devices running an application and/or a client, such as a smart phone running a DASH client. In the various embodiments, HTTP servers may be configured to generate status codes identifying that an incomplete version of a file is being returned in response to a file request. In an embodiment, an HTTP server may be configured to determine the ability of a client device to handle incomplete versions of files. In an embodiment, a client device may indicate its ability to handle incomplete versions of files via an indication in the file request message sent to the HTTP server. As an example, the client device may indicate its ability to handle incomplete versions of files via information in the file request header. In an embodiment, the client device may determine whether the clients and/or applications running on the client device are enabled to handle incomplete versions of files upon receiving an incomplete version of a file from an HTTP server. In another embodiment, upon determining that the client device is capable of handling partial files, the HTTP server may send partial content in a response message along with an indication of partial delivery of the content. In an embodiment, incomplete portions of a file may be provided to a requesting client. Thus, in an embodiment, if non-sequential byte ranges (i.e., incomplete portions of the file) are available at the server, such as bytes 0-15 and 30-88, the non-sequential byte ranges (i.e., incomplete portions of the file) may be provided to the client. For example, the client may be sent bytes 0-15 and 30-88. Additionally, if the first byte requested is not available, such as only bytes 2-88, in an embodiment, those available bytes may still be sent.

FIG. 1 illustrates a network system 100 suitable for use with the various embodiments. The network system 100 may include a receiver device 102, such as a smart phone, and a server 112 connected to the Internet 110. The receiver device 102 may establish a wireless connection 114 with a wireless access point 104, such as a Wi-Fi access point. The wireless access point 104 may connect with the Internet 110. Additionally, the receiver device 102 and a cellular tower or base station 106 may exchange data via a cellular connection 116, including a CDMA, TDMA, GSM, PCS, 3G, 4G, LTE, or any other type connection. The cellular tower or base station 106 may be in communication with a router 108 which may connect to the Internet 110. Further, the receiver device 102 may establish a wired connection 117 with a router 109 which may connect to the Internet 110. In this manner, via the connections to the wireless access point 104, cellular tower or base stations 106, router 109, and/or Internet 110, data may be exchanged between the receiver device 102 and the server 112.

Figure 2:
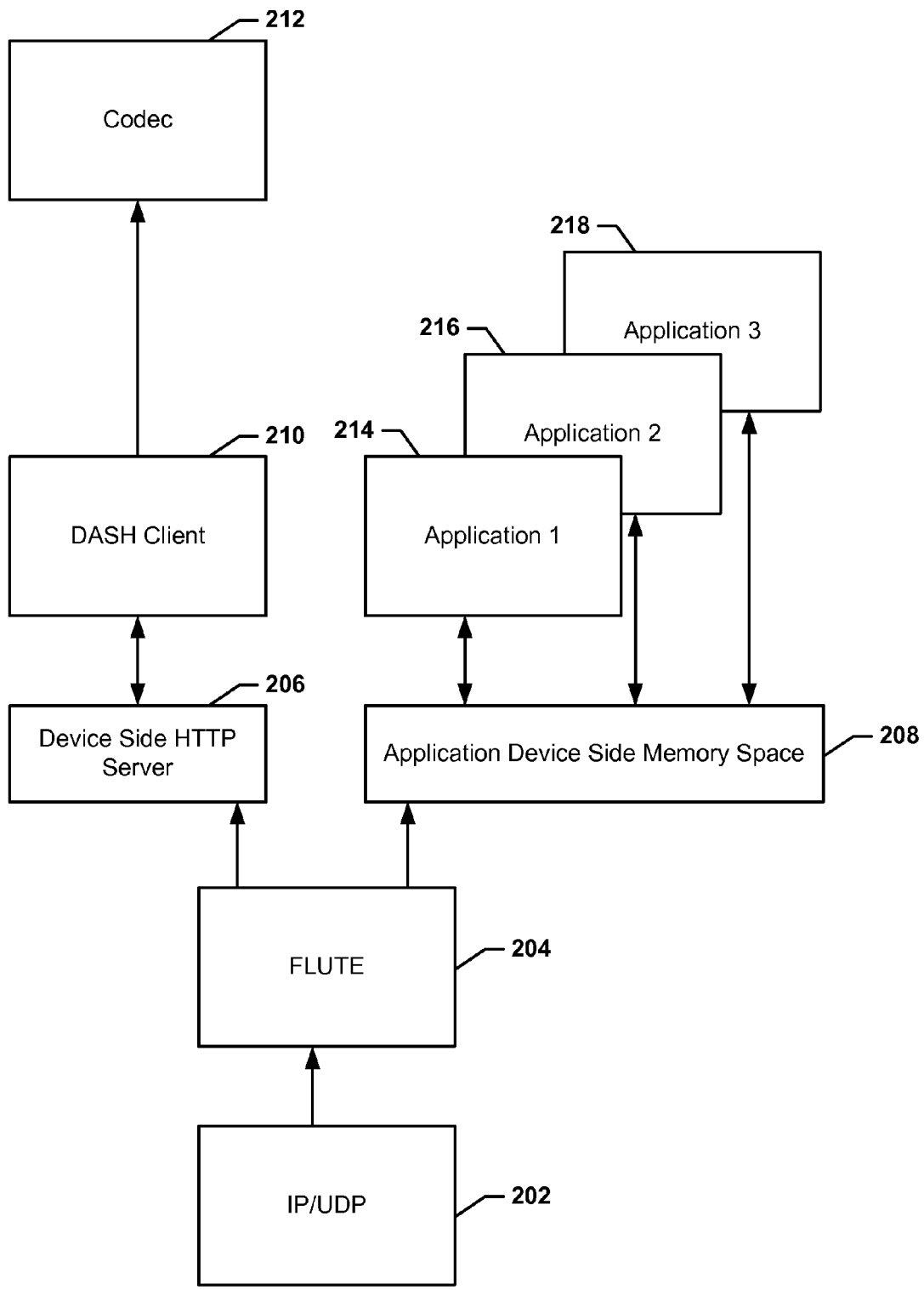
FIG. 2 is a system block diagram illustrating the relationship between transport layers and application and/or client layers in a computing device utilizing the enhanced FLUTE protocol according to the various embodiments.

FIG. 2 illustrates an embodiment relationship between transport layers and application and/or client layers in a computing device utilizing the enhanced FLUTE protocol. In an embodiment, files may be received at the computing device via the IP/UDP transport layer 202. As an example, broadcast files sent from the server 112 to the wireless device 102 via the Internet 110 as discussed above with reference to FIG. 1, may be received at the wireless device 102 at the IP/UDP transport layer 202. In an embodiment, the files may be segments of a media file sent via the Internet.

The IP/UDP transport layer 202 may pass the received files to the FLUTE layer 204. In an embodiment, the FLUTE layer 204 may be an application enabled to utilize the enhanced FLUTE protocol to pass files from the IP/UDP transport layer 202 to applications and/or clients, such as a DASH client 210, application 214, application 216, and/or application 218. While discussed in terms of one client (i.e., DASH client 210) and three applications (i.e., application 214, application 216, and application 218), the number of clients and/or applications that the FLUTE layer 204 may pass files to may be unlimited. In an embodiment, the FLUTE layer 204 may apply error correction to the received files, such as FEC. In an embodiment, the FLUTE layer 204 may received indications from the applications and/or clients, such as a DASH client 210, application 214, application 216, and/or application 218, which may indicate if the applications and/or clients may be enabled to utilize incomplete versions of files. As an example, a file request from the DASH client 210 may indicate the DASH client 210 is enabled to utilize incomplete versions of files. In an embodiment, the FLUTE layer 204 may assign a conventional URL/URI to completely received files and may assign a modified URL/URI to partially received files. In an embodiment, the modified URL/URI may include information based on the missing file portions, such as information indicating the location of the missing data from the file (e.g. byte ranges and/or substitution codes). In an embodiment, the FLUTE layer 204 may discard files which may be of no use to applications and/or clients, such as the DASH client 210, application 214, application 216, and/or application 218, served by the FLUTE layer 204. In an embodiment, the FLUTE layer 204 may include metadata with the incomplete versions of files, such as additional file(s) and/or file header(s) for the incomplete versions of files. In an embodiment, incomplete versions of files may include a subset of the source symbols and the repair symbols originally transmitted. In an embodiment, the source symbols may be stored in a separate file from the repair symbols. In another embodiment, the source symbols and the repair symbols may be stored in the same file. In an embodiment, after a given period of time, the FLUTE layer 204 may be enabled to remove files from memory locations (i.e., a memory cache) of the computing device, such as the device side HTTP server 206 and/or the application device side memory space 208. In this manner, memory cache (e.g., a memory stack) overflow issues may be avoided as new files are passed by the FLUTE layer 204.

The FLUTE layer 204 may parse the received files and pass the files to the device side HTTP server 206 and/or the application device side memory space 208 (e.g., a memory cache) depending on the intended target application and/or client, such as the DASH client 210, application 214, application 216, and/or application 218. In an embodiment, the device side HTTP server 206 may be an application resident on the computing device with its own assigned memory space (e.g., memory cache) on the computing device. In another embodiment, the device side HTTP server 206 may utilize the same memory space (e.g., memory cache) as the application device side memory space 208 (e.g., memory cache). In an embodiment, the DASH client 210 may request and/or receive files from the device side HTTP server 206 and may pass the files to a codec 212 for eventual rendering of the content (e.g., playing the content) by the computing device. In an embodiment, a DASH client 210 may be enabled to utilize incomplete versions of files in rendering the content. In another embodiment, a DASH client 210 may be enabled to repair incomplete versions of files before rendering the content. In an embodiment, applications, such as application 214, application 216, and/or application 218 may request and/or receive files from the application device side memory space 208 (e.g., memory cache). In an embodiment, the application 214, application 216, and application 218 may be enabled to handle incomplete versions of files differently. As an example, application 214 may not be able to handle incomplete versions of files, application 216 may be able to play incomplete versions of files, and application 218 may be enabled to repair incomplete versions of files. In such an example, application 214 may ignore modified URLs/URIs, application 216 may attempt to play the incomplete versions of files corresponding to modified URLs/URIs, and application 218 may attempt to repair incomplete versions of files corresponding to modified URLs/URIs based on metadata included in/with the received incomplete versions of files by the FLUTE layer 204. In an embodiment, applications/clients enabled to play and/or repair incomplete versions of files, such as DASH client 210, application 216, and/or application 218, may be enabled to exchange messages directly with the enhanced FLUTE layer 204 to request and receive incomplete versions of files. In an embodiment, the applications/clients enabled to play and/or repair incomplete versions of files, such as DASH client 210, application 216, and/or application 218, may indicate via explicit inline signaling to the FLUTE layer 204 that they are enabled to play and/or repair incomplete versions of files to render the content. The FLUTE layer 204 may receive the indication that the applications/clients, such as DASH client 210, application 216, and/or application 218, are enabled to utilize incomplete versions of files, and may provide incomplete versions of files to the applications/clients, such as DASH client 210, application 216, and/or application 218. The FLUTE layer 204 may also indicate in the response including the incomplete versions of files that the response includes incomplete versions of files.

Figure 3:
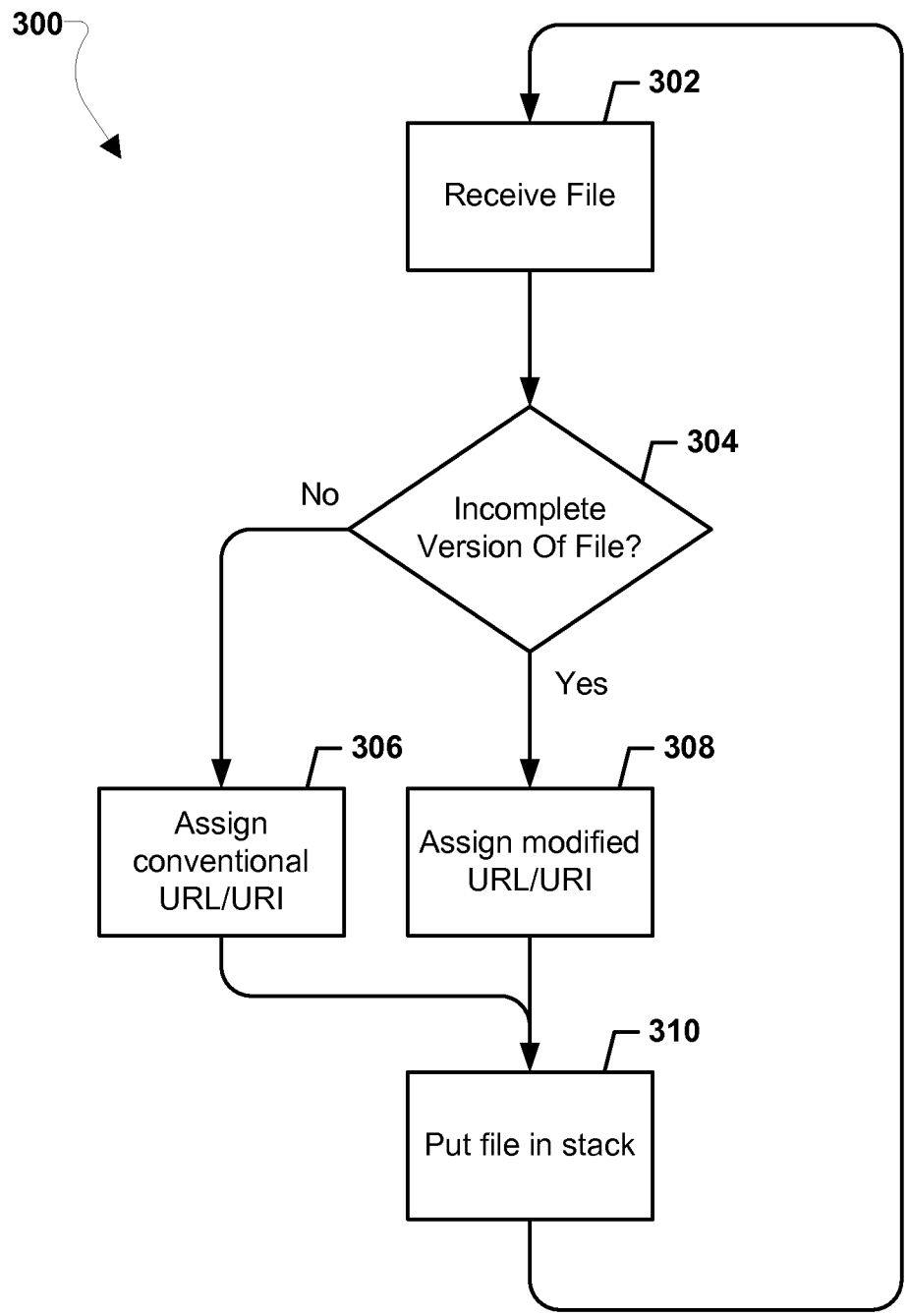
FIG. 3 is a process flow diagram illustrating an embodiment method for assigning a URL/URI to a file according to the enhanced FLUTE protocol.

FIG. 3 illustrates an embodiment method 300 for assigning a URL/URI to a file according to the enhanced FLUTE protocol. In block 302 the computing device processor may receive the file. In an embodiment, the file may be a segment of a media file transmitted to the computing device over the Internet. In determination block 304 the computing device processor may determine whether the file may be an incomplete version of a file. In an embodiment, incomplete versions of files may be those files received by the computing device that are missing data and/or that include corrupted data. In an embodiment, the processor may employ error correction, such as FEC, to the file to reconstitute the file though a portion of the data in the file may be missing and/or corrupted. In an embodiment, a successfully reconstituted file may be a complete file. If the file is a complete file (i.e., determination block 304="No"), in block 306 the computing device processor may assign a conventional URL/URI to the file. In an embodiment, a conventional URL/URI may be a URL/URI corresponding to the naming convention agreed upon between the enhanced FLUTE layer and the application and/or client, such as a DASH client, based on information in the MPD received from the application and/or client. In block 310 the processor may put the file with its assigned URL/URI in the stack and the processor may return to block 302 and receive the next file.

If the file is an incomplete version of a file (i.e., determination block 304="Yes"), in block 308 the processor may assign a modified URL/URI. In an embodiment, the modified URL/URI may be different from the naming convention agreed upon between the enhanced FLUTE layer and the application and/or client based on information in the MPD. In a basic embodiment, the modified URL/URI may be the same as the agreed naming convention, except with the addition of an additional identifier indicating the corresponding file is an incomplete version of a file. In another embodiment, the modified URL/URI may include information based on the missing file portions, such as information indicating the location of the missing data from the incomplete version of a file (e.g. byte ranges and/or substitution codes).

An example schema for enhanced FLUTE to provide byte ranges and substitution codes may be as follows:

```
<xs:element name="partialFileMetadata">
    <xs:complexType>
        <xs:sequence>
            <xs:element name="byteRanges" maxOccurs="unbounded">
                <xs:complexType>
                    <xs:attribute name="start" type="xs:int"/>
                    <xs:attribute name="length" type="xs:int"/>
                </xs:complexType>
            </xs:element>
            <xs:element name="substituitionCode" type="xs:byte"/>
        </xs:sequence>
    </xs:complexType>
</xs:element>
```

As discussed further below, in a further embodiment, the incomplete version of a file may also be stored with additional data, such as source and repair symbols. In block 310 the processor may put the file with its assigned URL/URI in the stack, and the processor may return to block 302 to receive the next file. In this manner, the enhanced FLUTE protocol may continually receive files and assign conventional and/or modified URLs/URIs.

Figure 4:
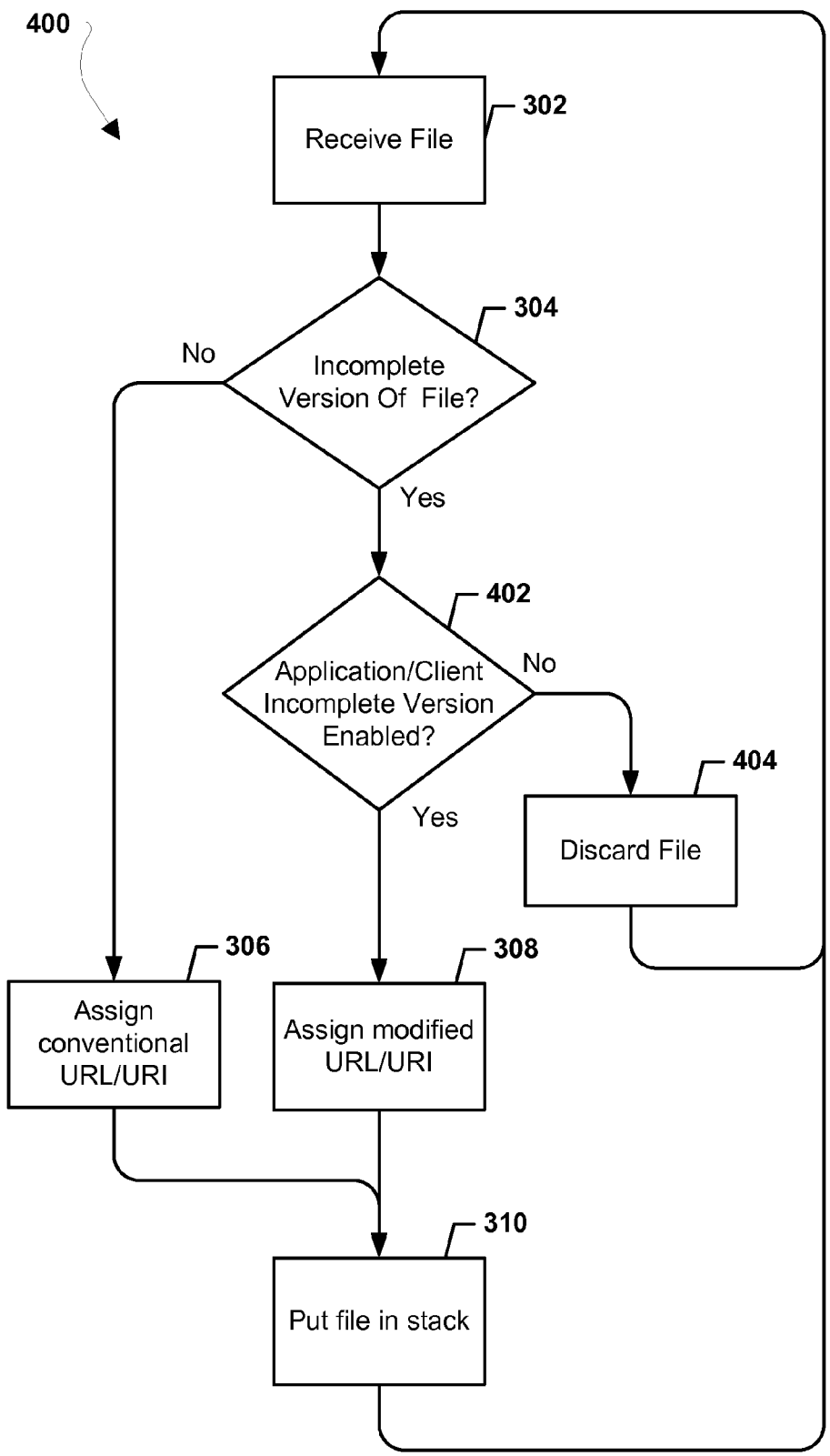
FIG. 4 is a process flow diagram illustrating another embodiment method for assigning a URL/URI to a file according to the enhanced FLUTE protocol.

FIG. 4 illustrates an embodiment method 400 for assigning a URL/URI to a file according to the enhanced FLUTE protocol similar to method 300 described above with reference to FIG. 3, except that a computing device processor implementing method 400 may determine whether the application and/or client is enabled to accept an incomplete version of a file. As discussed above, in block 302 the computing device may receive a file, and in determination block 304 the computing device processor may determine whether the files is an incomplete version of a file or a complete file. If the file is a complete file (i.e., determination block 304="No"), as discussed above, in block 306 the computing device may assign a conventional URL/URI to the file. As discussed above, in block 310 the computing device may put the file in the stack, and the processor may return to block 302.

If the file is an incomplete version of a file (i.e., determination block 304="Yes"), in determination block 402 the computing device may determine whether the application and/or client the file may be intended for (i.e., target application and/or client) is incomplete version of a file enabled (i.e., is capable of receiving/processing incomplete files). In an embodiment, the enhanced FLUTE layer may receive an indication from an application and/or client that the application and/or client may utilize incomplete versions of files. As an example, a DASH client may send an indication as part of a file request that it can utilize incomplete versions of files. If the application and/or client is not incomplete version of a file enabled (i.e., determination block 402="No"), in block 404 the FLUTE layer may discard the incomplete version of a file and the processor may return to block 302 to continue receiving files. In this manner, no data storage may be utilized for files which may not be utilized. If the application and/or client is incomplete version of a file enabled (i.e., determination block 402="Yes"), as discussed above, in block 308 the computing device may assign a modified URL/URI to the incomplete version of a file. As discussed above in block 310 the computing device may put the file in the stack, and the processor may return to block 302 to continue receiving files.

Figure 5:
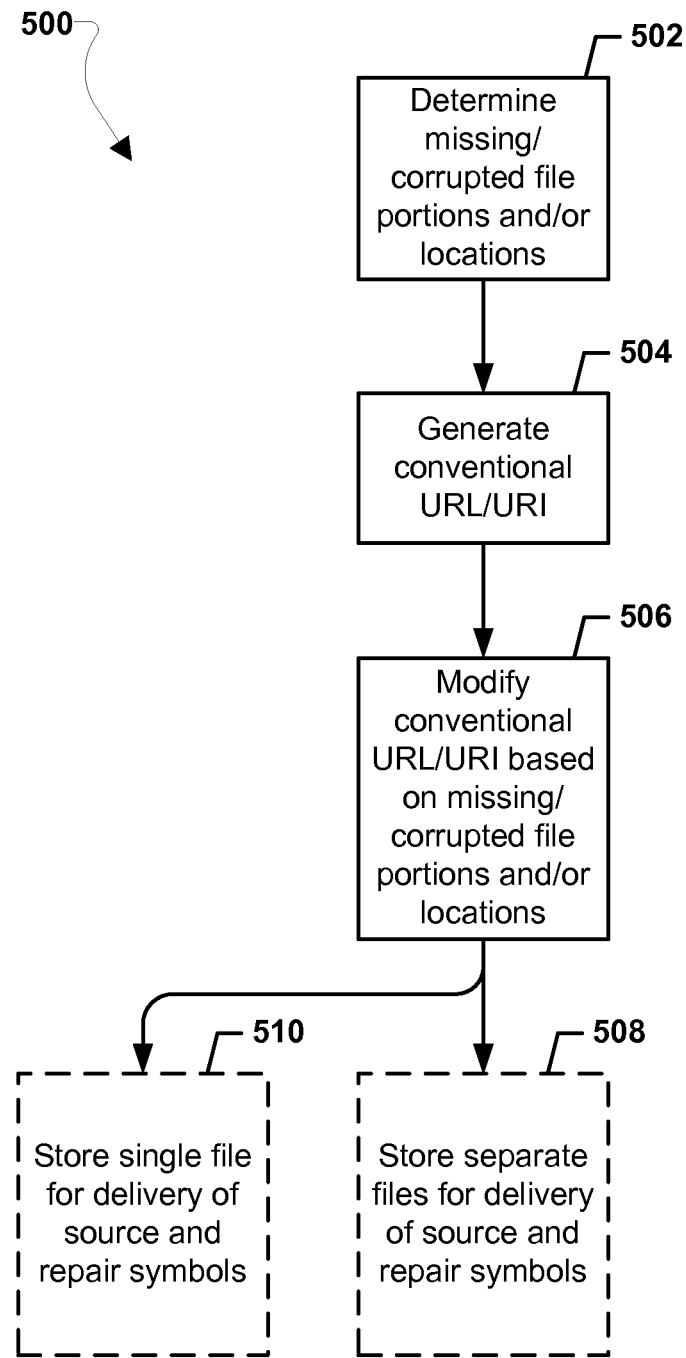
FIG. 5 is a process flow diagram illustrating an embodiment method for assigning a modified URL/URI to a partially received file according to the enhanced FLUTE protocol.

FIG. 5 illustrates an embodiment method 500 for assigning a modified URL/URI to an incomplete version of a file. In the various embodiments the method 500 may be performed by a computing device processor in conjunction with methods 300 and 400 discussed above. In block 502 the computing device processor may determine the missing file portions and/or locations in the incomplete version of a file. In block 504 the processor may generate a conventional URL/URI for the incomplete version of a file. In an embodiment, a conventional URL/URI may be a URL/URI corresponding to the naming convention agreed upon between the enhanced FLUTE layer and the application and/or client, such as a DASH client, based on information in the MPD received from the application and/or client. In block 506 the processor may modify the generated conventional URL/URI based on the missing file portions and/or locations. In an embodiment, the conventional URL/URI may be modified to indicate it corresponds to an incomplete version of a file. As an example, the conventional URL/URI may be modified by appending additional URL/URI information including the byte ranges and/or substitution codes for the missing data as discussed above. In an embodiment, the modifications to the URL/URI may be such that an application and/or client not enabled to recognize modified URLs/URIs may be unable to utilize the file corresponding to the modified URL/URI.

In an optional embodiment, in block 508 the processor may store separate files for delivery of source and repair symbols with the incomplete version of a file. In another optional embodiment, in block 510 the processor may store a single file for delivery of the source and repair symbols.

Figure 6:
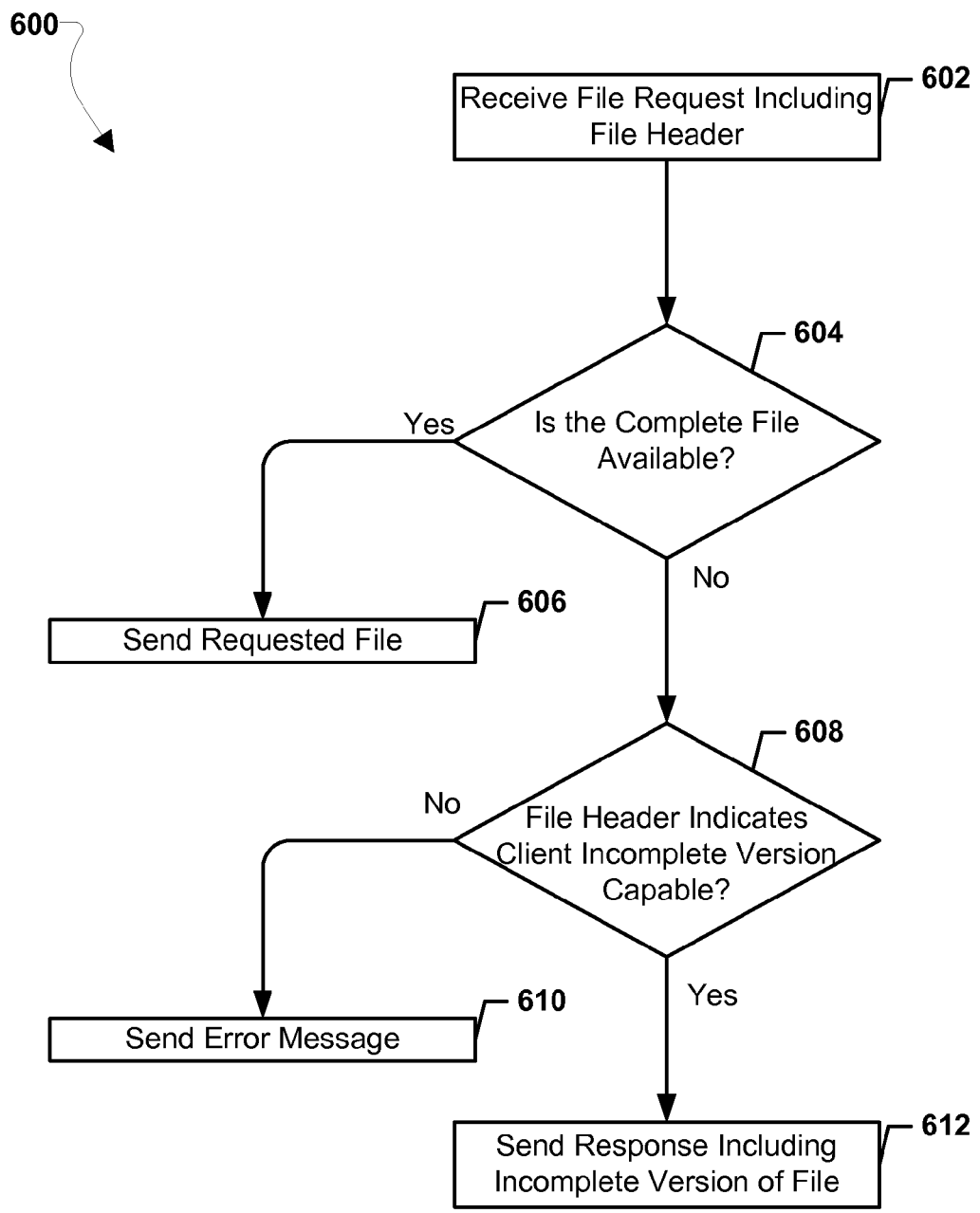
FIG. 6 is a process flow diagram illustrating an embodiment method for sending a response including an incomplete version of a file.
Figure 7:
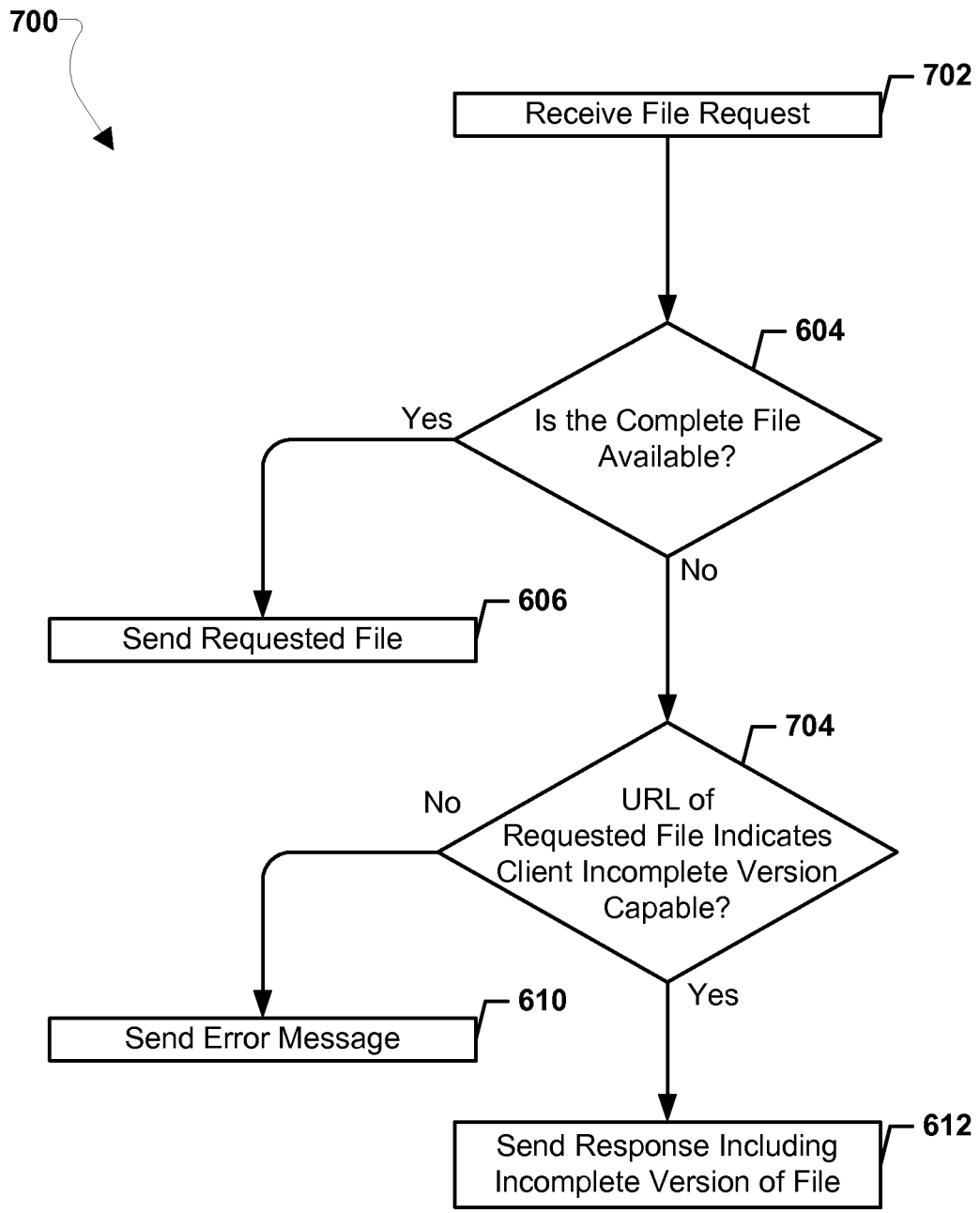
FIG. 7 is a process flow diagram illustrating another embodiment method for sending a response including an incomplete version of a file.
Figure 8:
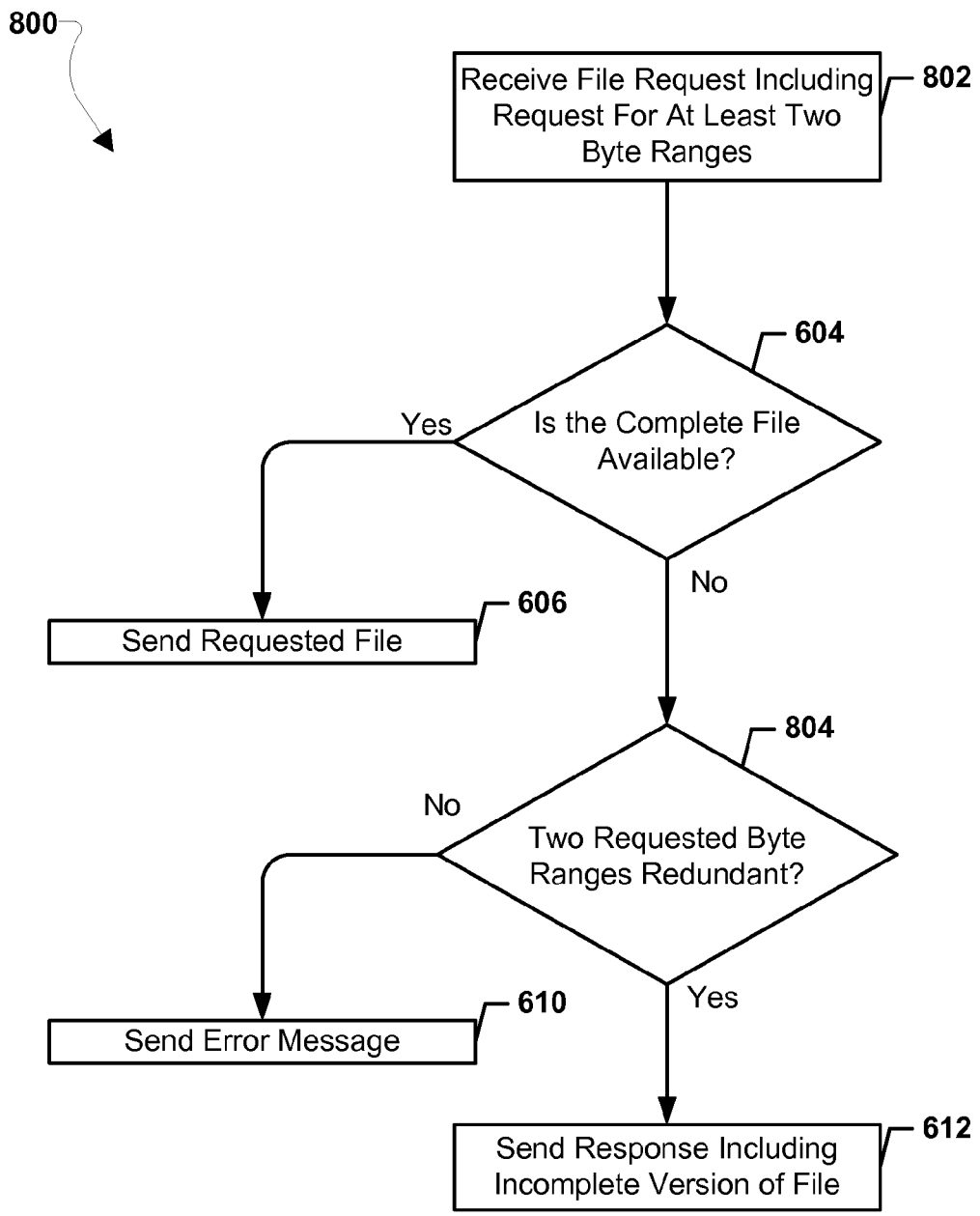
FIG. 8 is a process flow diagram illustrating a third embodiment method for sending a response including an incomplete version of a file.

The various embodiments enable enhanced HTTP servers to provide incomplete versions of files in response to client requests. FIGS. 6-8 illustrate embodiment methods for enhanced HTTP handling of client requests for incomplete versions of files. While discussed in terms of client devices and enhanced HTTP servers the operations of the embodiment methods illustrated in FIGS. 6-8 may be performed by any two devices and/or applications operating in a client/server relationship according to an enhanced HTTP as discussed herein.

FIG. 6 illustrates an embodiment method 600 for sending a response including an incomplete version of a file. In an embodiment, the operations of method 600 may performed by a processor of an enhanced HTTP server. In block 602 the enhanced HTTP server may receive a file request including a file header. In an embodiment, the file header may indicate that the client originating the file request is capable of using an incomplete response, such as an incomplete version of a file (if a complete file is requested) or an incomplete version of a byte range (if a byte range is specified in the file request). As examples, a header field or tag in the file header may indicate the client is capable of using an incomplete version of a file or an incomplete version of a byte range. In determination block 604 the enhanced HTTP server may determine whether the available file corresponding to the received file request (i.e., the requested file) is a complete version of the file. In an embodiment, the enhanced HTTP server may determine whether the file begins with missing/corrupted data portions and/or the file has intermediate missing/corrupted data portions to determine whether the available file is complete or incomplete. In another embodiment, the URL of the file request may indicate that the file is an incomplete version of a file because the URL itself may be associated with a predetermined incomplete version of a file storage location known to the enhanced HTTP server. If the file is complete (i.e., determination block 604="Yes"), in block 606 the enhanced HTTP server may send the requested file to the client. In an embodiment, the enhanced HTTP server may indicate the response is a full a response including the full requested file, and not an incomplete response. If the file is an incomplete version of a file (i.e., determination block 604="No"), in determination block 608 the enhanced HTTP server may determine whether the file header indicated the client is capable of using an incomplete response, such as an incomplete version of a file. In an embodiment, the file header may include an indication, such as a header field or tag indicating the client is capable of using an incomplete response, such as an incomplete version of a file. If the client cannot use an incomplete response, such as an incomplete version of a file (i.e., determination block 608="No"), in block 610 the enhanced HTTP server may send an error message to the client. If the client can use an incomplete response, such as an incomplete version of a file (i.e., determination block 608="Yes"), in block 612 the enhanced HTTP server may send a response including an incomplete version of the file to the client. In an embodiment, the response including the incomplete version of the file may include an indication that the response is an incomplete response, e.g., an indication that the response includes an incomplete version of the file, and not the full requested file.

FIG. 7 illustrates an embodiment method 700 similar to method 600 described above with reference to FIG. 6, except that in method 700 the file request generated by the client device may not include any additional indication that the client device may be capable of using an incomplete version of a file in the file header. In block 702 the enhanced HTTP server may receive a file request. In an embodiment, the file request may not include an added indication in the file header that the client may be capable of using an incomplete version of a file. As discussed above, in block 604 the enhanced HTTP server may determine whether a complete version of the requested file is available to the server. If the file is complete (i.e., determination block 604="Yes"), in block 606 the enhanced HTTP server may send the requested file to the client. If the file available to the server is an incomplete version of a file (i.e., determination block 604="No"), in determination block 704 the enhanced HTTP server may determine whether the URL of the requested file indicated the client is capable of using an incomplete version of a file. In an embodiment, the URL corresponding to the file request may be a modified URL indicating the client is incomplete version of a file capable. In another embodiment, the location corresponding to the URL may be designated specifically for an incomplete version of a file and based on that file request corresponding to that location, the enhanced HTTP server may identify the client device is capable of using an incomplete version of a file. If the client cannot use an incomplete version of a file (i.e., determination block 704="No"), in block 610 the enhanced HTTP server may send an error message to the client. If the client can use an incomplete version of a file (i.e., determination block 704="Yes"), in block 612 the enhanced HTTP server may send a response including an incomplete version of the file to the client.

FIG. 8 illustrates an embodiment method 800 similar to method 600 described above with reference to FIG. 6, except that in method 800 the file request generated by the client device may include a request for at least two byte ranges. In an embodiment, an enhanced HTTP server may be configured to treat a request for redundant byte ranges as an indication that a client is capable of using incomplete responses. In block 802 the enhanced HTTP server may receive a file request including a request for at least two byte ranges. As discussed above, in block 604 the enhanced HTTP server may determine whether a complete version of the requested file is available to the server. If the available file is complete (i.e., determination block 604="Yes"), in block 606 the enhanced HTTP server may send the requested file to the client. If the file is an incomplete version (i.e., determination block 604="No"), in determination block 804 the enhanced HTTP server may determine whether the received file request includes two redundant byte ranges. In an embodiment, redundant byte ranges may be two requested byte ranges that overlap in at least one requested byte. In an embodiment, a request including redundant requested byte ranges may be an indication to the enhanced HTTP server that the client is capable of using incomplete versions of files. If there are not two requested redundant byte ranges (i.e., determination block 804="No"), in block 610 the enhanced HTTP server may send an error message to the client. If there are two requested redundant byte ranges (i.e., determination block 804="Yes"), in block 612 the enhanced HTTP server may send a response including an incomplete version of the file to the client.

Figure 9:
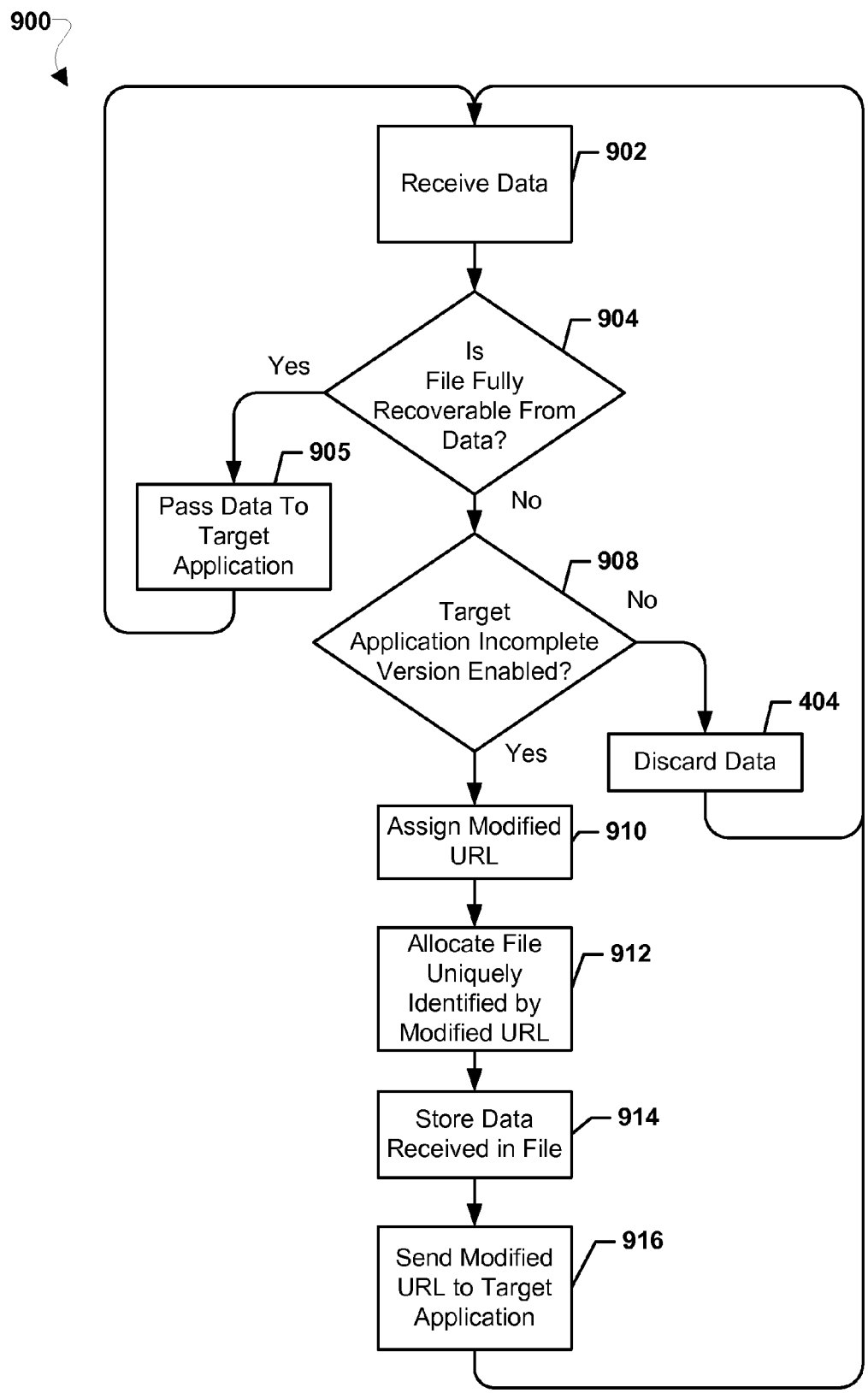
FIG. 9 is a process flow diagram illustrating an embodiment method for delivering incomplete versions of files to a target application from an enhanced FLUTE client.

FIG. 9 illustrates an embodiment method 900 for delivering incomplete versions of files to a target application from an enhanced FLUTE client. In block 902 the enhanced FLUTE client operating on a computing device may receive data for a file. In various embodiments, the data may be a portion of a file, such as a segment of a media file transmitted to the computing device over the Internet. In an embodiment, the data may also include source symbols and repair symbols. In determination block 904 the enhanced FLUTE client may determine whether the file is or will be fully recoverable from the data received in block 902. As part of this determination, the enhanced FLUTE client may apply error corrections routines, such as FEC, to determine whether data was decoded and recovered from the received data. If the data was fully recovered or the file will be recoverable (i.e., determination block 904="Yes"), in block 905 the data may be passed to the target application receiving the data file, and the processor may return to block 902 to receive the next portion of data for the file or another file.

If the processor determines that the file will not be fully recoverable (i.e., determination block 904="No"), in determination block 908 the enhanced FLUTE client may determine whether the target application is enabled to utilize incomplete data or incomplete versions of files. In an embodiment, the enhanced FLUTE protocol may determine the target application is enabled to utilize the incomplete version of a file based on information stored in memory. As an example, the computing device may maintain a data table in memory of applications that have identified that they are enabled to utilize incomplete data or incomplete versions of files, and the enhanced FLUTE protocol may reference the data table in determination block 908. If the target application is not enabled to utilize an incomplete version of a file data (i.e., determination block 908="No"), in block 404 the enhance FLUTE client may discard the data and return to block 902 to receive the next portion of data for the file or another file.

If the target application is enabled to utilize an incomplete version of a file data or an incomplete version of a file (i.e., determination block 908="Yes"), in block 910 the enhanced FLUTE client may assign one or more modified URLs (which may be unique) to the recovered data, to receive the recovered data or to receive the file. In an embodiment, the modified URLs may include information associated with the incomplete version of a file data or the incomplete version of a file, such as byte ranges and substitution codes corresponding to a missing or corrupted portion of the incomplete data. In an embodiment, the modified URL may identify whether the URL is associated with source data, repair data, and/or substitution codes for the incomplete version of a file.

In block 912 the enhanced FLUTE client may allocate at least one associated file for the modified URL. In an embodiment, the associated file may be uniquely identified by the modified URL. In an embodiment, the enhanced FLUTE client may allocate an associated file for each modified URL, in which case each associated file may be uniquely identified by one of the one or more modified URLs. As an example, the enhanced FLUTE player may assign two URLs and may allocate two associated files, one for each URL.

In block 914 the enhanced FLUTE client may store the incomplete data or incomplete version of a file in the allocated associated file. In an embodiment, all of the data received for the may be stored in the same allocated associated file. In another embodiment, a portion of the received data may be stored in one or more allocated associated files. In an embodiment, the portion of the received data stored in each of a plurality of allocated associated files may be different. In an embodiment, source symbols and repair symbols for the incomplete data may be stored together in the same associated file. In an embodiment, repair symbols and source symbols for the incomplete data may be stored in separate associated files. In block 916 the enhanced FLUTE client may send the modified URL to the target application. In an embodiment, the enhanced FLUTE client may send more than one modified URL to the target application. In an alternative embodiment, the enhance FLUTE client may store the URL(s) in a memory location accessible by the target application and the target application may retrieve the URL(s) at a given periodicity. The process may continue with the processor returning to block 902 to receive the next segment of data.

Figure 10:
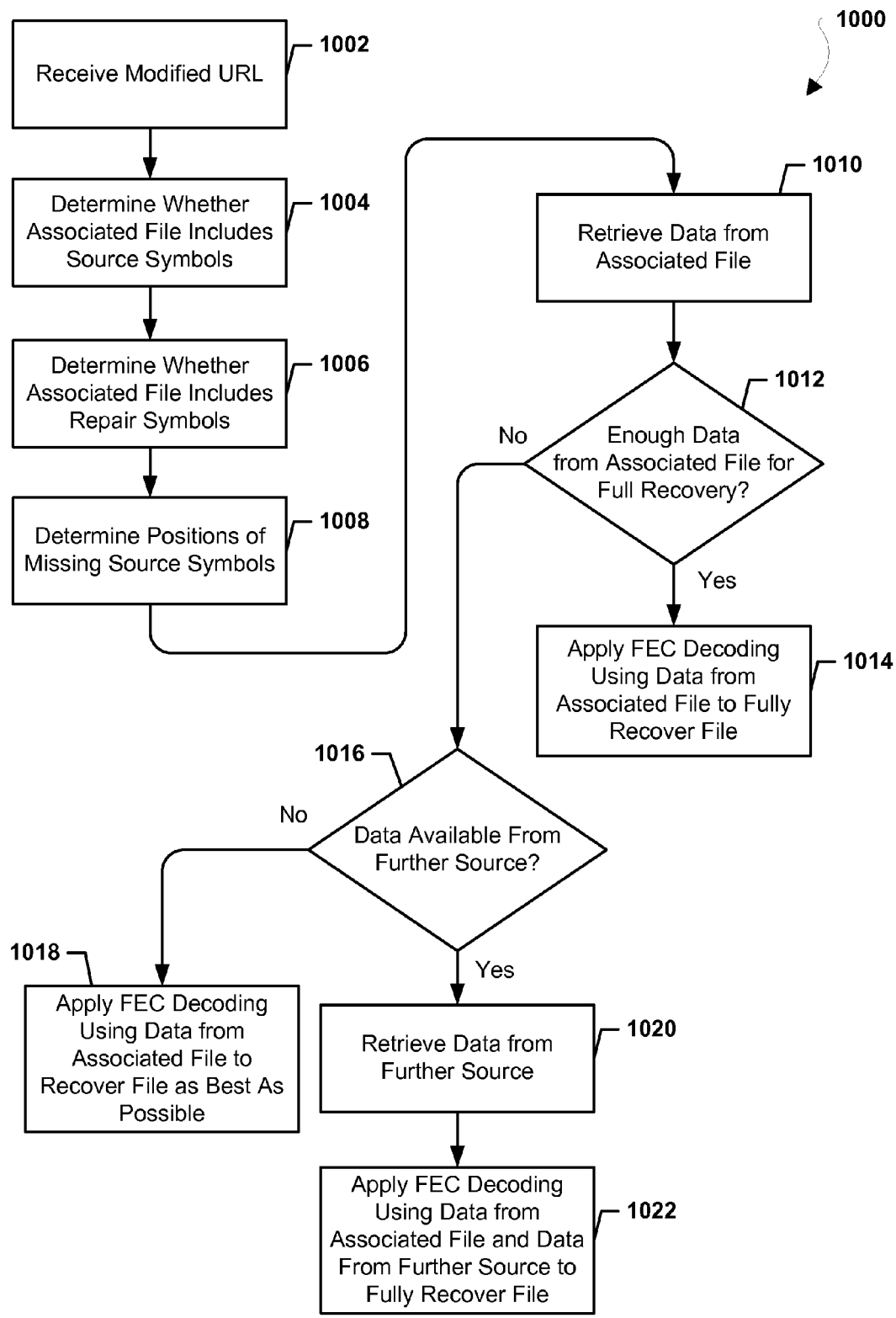
FIG. 10 is a process flow diagram illustrating an embodiment method for utilizing a modified URL at a target application.

FIG. 10 illustrates an embodiment method 1000 for utilizing a modified URL at a target application, such as a DASH client. In block 1002 the target application may receive the modified URL. In an embodiment, the modified URL may be a URL generated by an enhanced FLUTE client in response to receiving incomplete data. In an embodiment, the target application may receive the modified URL directly from an enhanced FLUTE client. In another embodiment, the target application may retrieve the modified URL from a memory location where modified URLs may be stored by a FLUTE client. In block 1004 the target application may determine whether the associated file includes source symbols for the incomplete data. In an embodiment, the target application may determine whether the associated file includes source symbols based at least in part on the modified URL. As an example, the modified URL may include in indication that the URL is associated with source symbols, such as a defined code or word, and the target application may include programming correlating the defined code or word with an associated file including source symbols. In an embodiment, the modified URL may itself include source symbols, and the target application may determine the URL is associated with source symbols based on the included source symbols.

In block 1006 the target application may determine whether the associated file includes repair symbols for the incomplete data. In an embodiment, the target application may determine whether the associated file includes repair symbols based at least in part on the modified URL. As an example, the modified URL may include an indication that the URL is associated with repair symbols, such as a defined code or word, and the target application may include programming correlating the defined code or word with an associated file including repair symbols. In an embodiment, the modified URL may itself include repair symbols, and the target application may determine the URL is associated with repair symbols based on the included repair symbols. In block 1008 the target application may determine the positions of any missing source symbols within the incomplete data. In an embodiment, the target application may determine the positions of any missing source symbols within the incomplete data or incomplete version of a file based at least in part on the modified URL. In an embodiment, the modified URL may include substitution codes and the target application may determine the positions of any missing source symbols within the incomplete data or incomplete version of a file by utilizing the substitution codes to determine the positions of any missing source symbols within the incomplete data or incomplete version of a file. In block 1010 the target application may retrieve the data from the associated file. In an embodiment, the target application may retrieve the data utilizing the modified URL to access the associated file and read the data stored in the associated file.

In block determination block 1012 the target application may determine whether enough data was retrieved from the associated file for full file recovery. As an example, the target application may determine whether enough source symbols and repair symbols were retrieved to fill in the missing source symbol positions. If the target application determines that enough data was retrieved (i.e., determination block 1012="Yes"), the target application may apply FEC decoding using the data retrieved from the associated file to fully recover the incomplete data or incomplete version of a file in block 1014. If the target application determines that enough data was not retrieved (i.e., determination block 1012="No"), in determination block 1016 the target application may determine whether data to help in fully recovering the incomplete data or incomplete version of a file is available from a further source, such as another memory location, different server, etc. If the target application determines that data is available from a further source (i.e., determination block 1016="Yes"), the target application may retrieve the data from the further source in block 1020, and may apply FEC decoding using data from the associated file and the further source to fully recover the incomplete data or incomplete version of a file in block 1022. If the target application determines that data is not available from a further source (i.e., determination block 1016="No"), the target application may apply FEC decoding using data from the associated file to recover the incomplete data or incomplete version of a file as best as possible in block 1018.

In a further embodiment, in response to receiving incomplete data, an enhanced FLUTE client may allocate a separate file and store information related to the byte ranges of any missing or corrupted portions of the incomplete data in that separate file. In an embodiment, the enhanced FLUTE client may assign a modified URL to that separate file storing the byte ranges.

Figure 11:
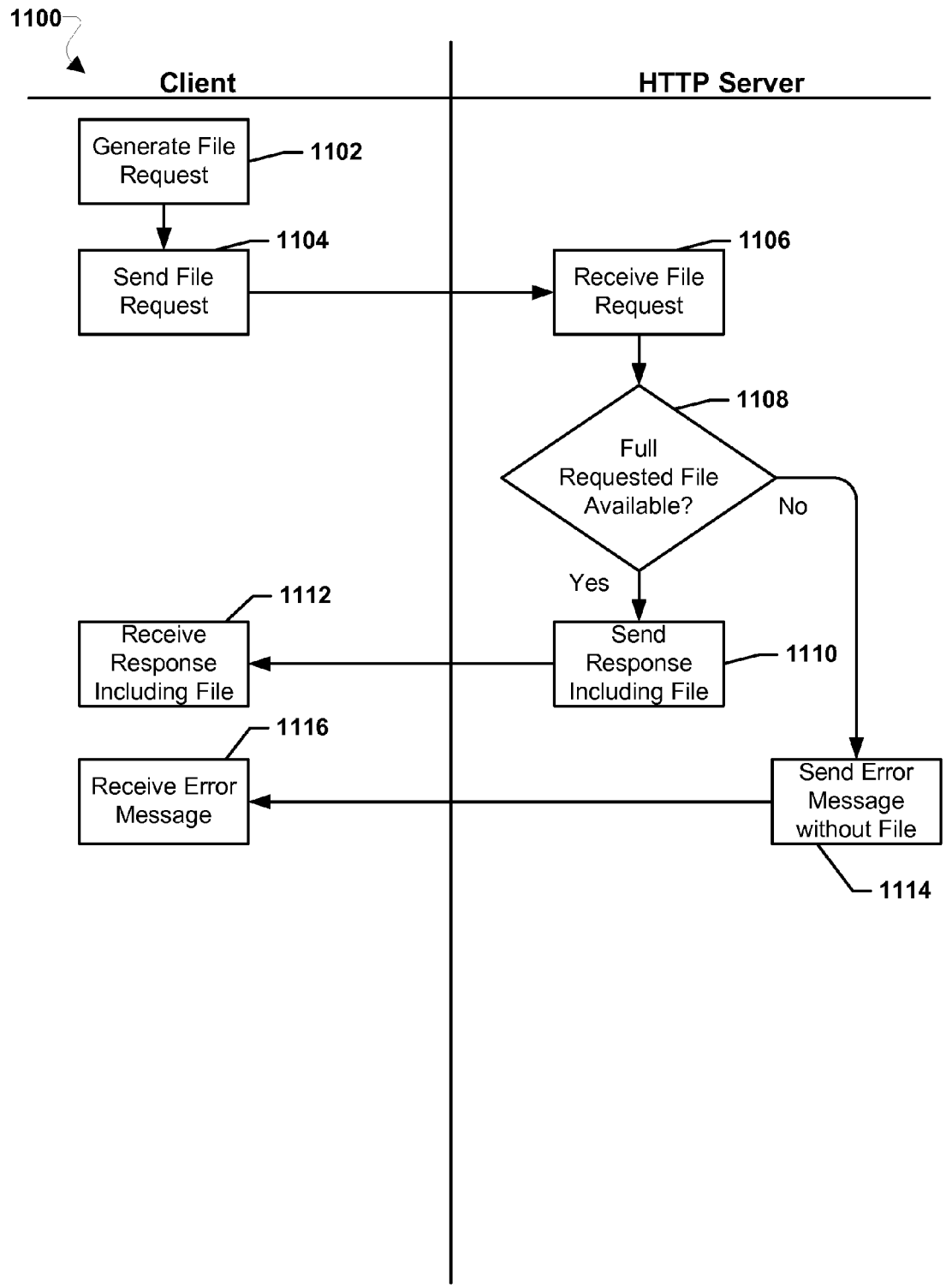
FIG. 11 is a process flow diagram illustrating a prior art method for HTTP server handling of client requests for incomplete versions of files.

FIG. 11 illustrates the prior art method 1100 employed by current HTTP servers for handling of client requests for incomplete versions of files. In block 1102 the client may generate a file request. A file request is a message, such as a "GET" operation (i.e., method) requesting a file. The file request includes the URL/URI of the requested file. In the current HTTP, file requests may also be performed using the "partial GET" operation which may include a request for a portion of a file at the URL/URI by including one or more byte ranges representing a subset of the total file associated with the URL/URI. However, in the current HTTP, the file request does not include an indication that the client is enabled to utilize an incomplete version of a file, with respect to either the full resource requested via the "GET," or a partial resource as indicated by the "partial GET." In effect, in the current HTTP file requests are effectively "all or nothing" requests indicating the client can only use the entire file or the entire subset of the file being requested. In block 1104 the client sends the file request to the HTTP server and in block 1106 the HTTP server receives the file request 1106. In determination block 1108 the HTTP server determines whether the full requested file is available. The HTTP server may determine whether the full requested file, or an entire subset is available by looking to the URL/URI associated with the file request and determining whether the file at the URL/URI is missing data and/or is corrupted in any way. In the current HTTP, only if the file or the sought entire subset is not missing data and/or not corrupted is the file or the sought entire subset determined to be full files and deemed eligible to be returned. If the full requested file is available (i.e., determination block 1108="Yes"), in block 1110 the HTTP server sends a response including the requested file and in block 1112 the client receives the response including the file. The response may include a status code indicating the entire requested file was retrieved successfully, such as 200 "OK." If the full requested file in not available (i.e., determination block 1108="No"), in block 1114 the HTTP server sends an error message without any portion of the requested file, and in block 1116, the client receives the error message. The error message may include a status code, such as 404 "Not Found." The drawback to the current HTTP method 1100 is that clients never receive the incomplete versions of files available at the server. Thus, in current HTTP systems, clients that are enabled to use incomplete versions of files cannot improve the end user media playback experience by playing incomplete versions of files because they do not receive incomplete versions of files from the HTTP servers.

The various embodiments improve the end user media playback experience by enabling enhanced HTTP servers to provide incomplete versions of files in response to client requests. FIGS. 12-15 illustrate embodiment methods for enhanced HTTP handling of client requests for incomplete versions of files. While discussed in terms of client devices and enhanced HTTP servers the operations of the embodiment methods illustrated in FIGS. 12-15 may be performed by any two devices and/or applications operating in a client/server relationship according to an enhanced HTTP as discussed herein.

Figure 12:
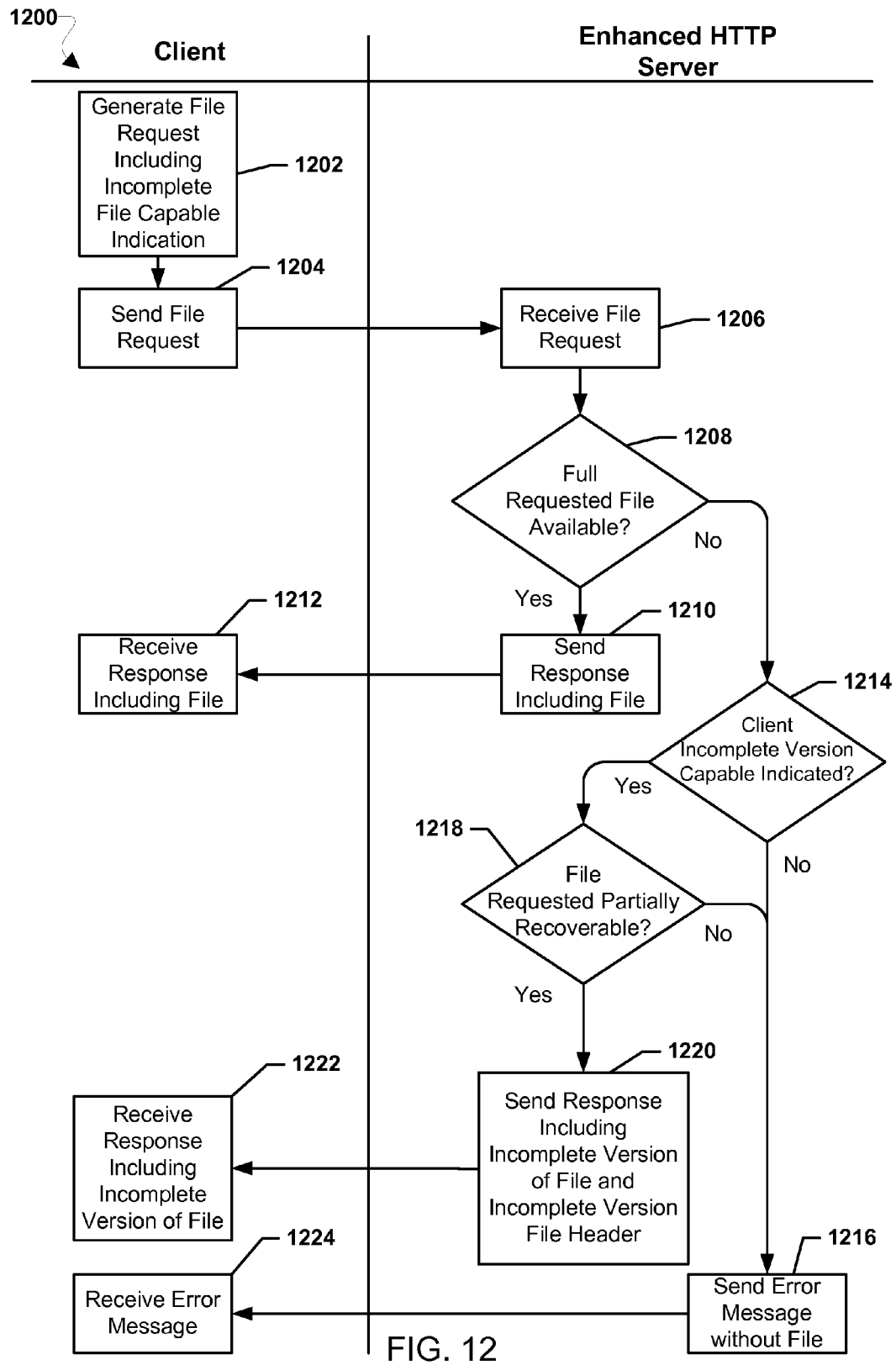
FIG. 12 is a process flow diagram illustrating an embodiment method for enhanced HTTP server handling of client requests for incomplete versions of files.

FIG. 12 illustrates an embodiment method 1200 for enhanced HTTP server handling of client device requests for incomplete versions of files. In block 1202 the client device may generate a file request including an incomplete version of a file capable indication. In an embodiment, a file request including an incomplete version of a file capable indication may be a request message, such as a "GET" operation (i.e., method), including a header indicating the client device is capable of using an incomplete version of a file (e.g., an incomplete file and/or corrupted file). In block 1204 the client device may send the file request to the enhanced HTTP server and in block 1206 the enhanced HTTP server may receive the file request.

In block 1208 the enhanced HTTP server may determine whether the full requested file is available. In an embodiment, the enhanced HTTP server may determine whether the full requested file is available by looking to the URL/URI associated with the file request and determining whether the file at the URL/URI is missing data and/or is corrupted in any way. Those files not missing data and/or not including corrupted data may be determined to be full files. Those files missing data and/or including corrupted data may be determined to be incomplete versions of files. In a further embodiment, the enhanced HTTP server may determine whether a file is a full or incomplete version of a file based on data stored with the file at the URL/URI, such as header data, indicating the status of the file as a full or incomplete version of a file. As an example, when the file is stored at the URL/URI the enhanced HTTP server may determine the file is a full or incomplete version of a file, and may indicate in a file header the status of the file. As another example, when received at the enhanced HTTP server the file may already include an indication of its status as an incomplete version of a file or the full file. If the enhanced HTTP server determines that the full requested file is available (i.e., determination block 1208="Yes"), in block 1210 the enhanced HTTP server may send a response including the full requested file and in block 1212 the client device may receive the response including the full requested file. The response may include a status code indicating the entire requested file was retrieved successfully, such as 200 "OK."

If the enhanced HTTP server determines that the full requested file in not available (i.e., determination block 1208="No"), in determination block 1214 the enhanced HTTP server may determine whether the client device has indicated it is capable of using an incomplete version of a file (e.g., an incomplete file and/or corrupted file). In an embodiment, the enhanced HTTP server may determine the client device is capable of using an incomplete version of a file based at least in part on the file request header. If the enhanced HTTP server determines that the client device is not capable of using an incomplete version of a file (i.e., determination block 1214="No"), in block 1216 the enhance HTTP server 1216 may send an error message without the requested file and/or any portion of the requested file to the client device and in block 1224 the client device may receive the error message. In an embodiment, the error message may be a message sent from the enhanced HTTP server to the client device including an error status code, such as 404 "Not Found."

If the enhanced HTTP server determines that the client device is capable of using an incomplete version of a file (i.e., determination block 1214="Yes"), in determination block 1218 the enhanced HTTP server may determine whether the file requested is or will be partially recoverable. As part of this determination, the enhanced HTTP server may apply error correction routines, such as FEC, to determine whether data was fully or partially decoded and recovered from the incomplete version of a file. As another example, FEC decoding may be performed by a separate FEC decoder which may inform the enhanced HTTP server whether a given file is complete or not, and that information from the FEC decoder may be used by the enhanced HTTP server to determine whether the file request is or will be partially recoverable. If the enhanced HTTP server determines that the file requested is not partially recoverable (i.e., determination block 1218="No"), as discussed above, in block 1216 the enhanced HTTP server may send an error message without the file and in block 1224 the client device may receive the error message. If the enhanced HTTP server determines that the file requested is partially recoverable (i.e., determination block 1218="Yes"), in block 1220 the enhanced HTTP server may send a response from the HTTP server to the client device including the incomplete version of a file and an incomplete version of a file header. In an embodiment, the incomplete version of a file may comprise source symbols and repair symbols. In an embodiment, the incomplete version of a file header may indicate that the response includes a file that was only partially recovered. In a further embodiment, the partial file header may include byte ranges and substitution codes corresponding to missing or corrupted portions of the partially recoverable file. In block 1222 the client device may receive the response including the incomplete version of a file.

Figure 13:
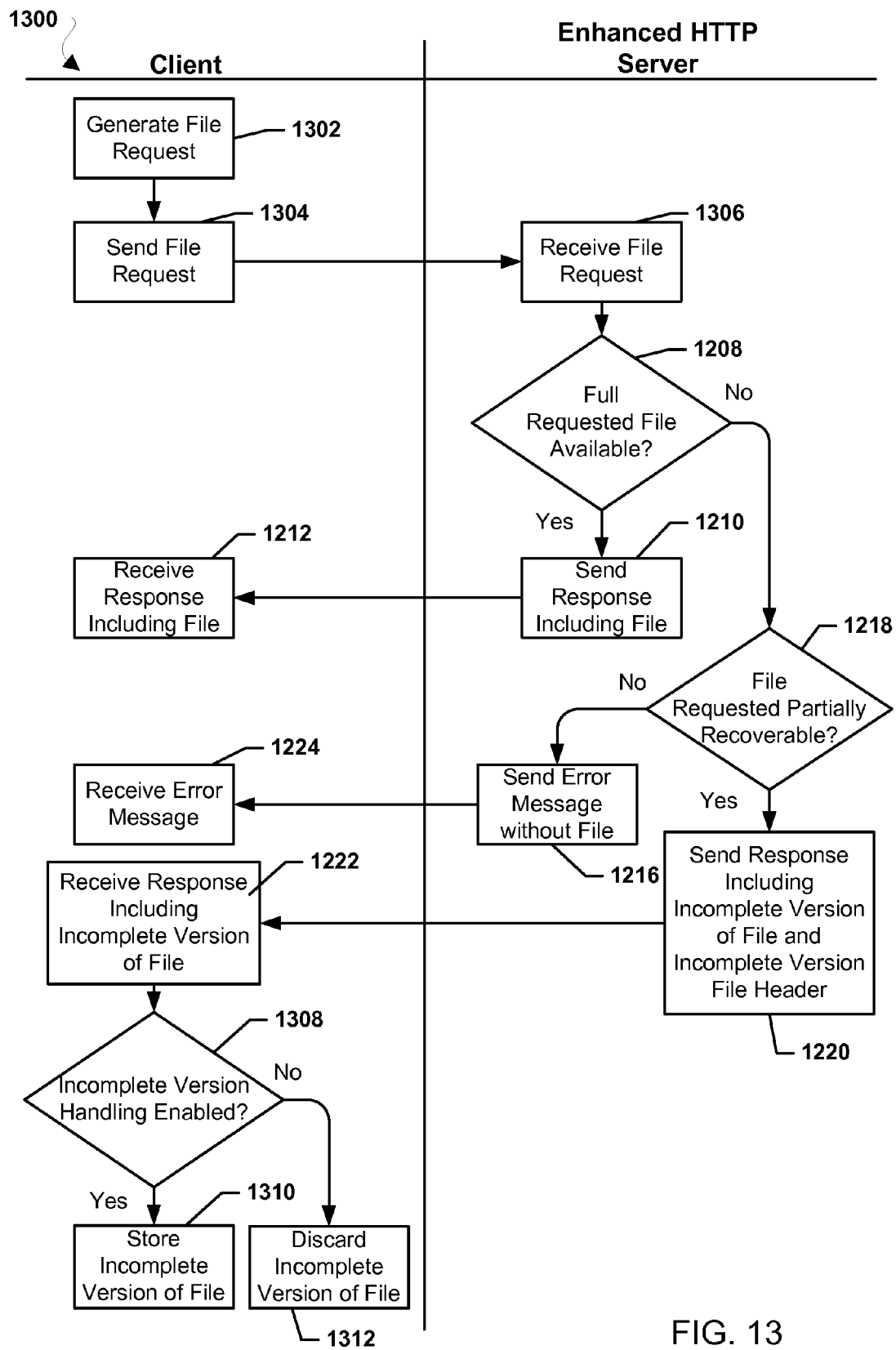
FIG. 13 is a process flow diagram illustrating another embodiment method for enhanced HTTP server handling of client requests for incomplete versions of files.
Figure 14:
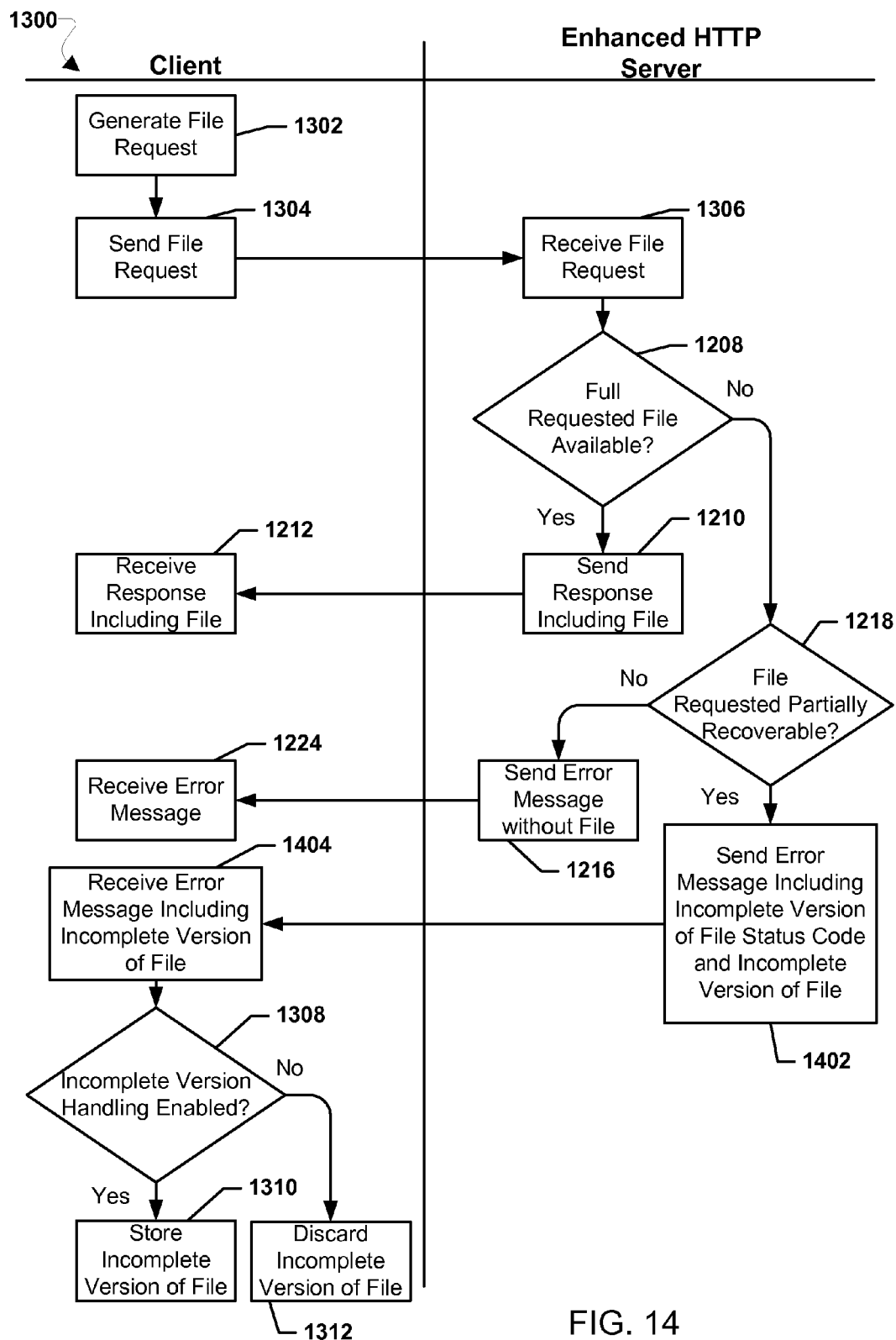
FIG. 14 is a process flow diagram illustrating a third embodiment method for enhanced HTTP server handling of client requests for incomplete versions of files.

FIG. 13 illustrates an embodiment method 1300 similar to method 1200 described above with reference to FIG. 12, except that in method 1300 the file request generated by the client device may not include an indication that the client device is capable of using a incomplete version of a file and the enhanced HTTP server may send incomplete versions of files without determining the capability of the client device to handle incomplete versions of files. In block 1302 the client device may generate a file request. In an embodiment, a file request including an incomplete version of a file capable indication may be a request message, such as a "GET" operation (i.e., method), and the file request may not include an indication of the client device's capability to handle incomplete versions of files. In block 1304 the client device may send the file request to the enhanced HTTP server, and in block 1306 the enhanced HTTP server 1306 may receive the file request. As described above with reference to FIG. 12, in determination block 1208 the enhanced HTTP server may determine whether the full requested file is available. If the enhanced HTTP server determines that the full requested file is available (i.e., determination block 1208="Yes"), as described above in block 1210 the enhanced HTTP server may send the response including the file and in block 1212 the client device may receive the response including the file. If the enhanced HTTP server determines that the full requested file is not available (i.e., determination block 1208="No"), without regard to the capabilities of the client device to handle incomplete versions of files, as discussed above with reference to FIG. 12, in determination block 1218 the enhanced HTTP server may determine whether the file requested is partially recoverable. As discussed above, if the enhanced HTTP server determines that the file requested is not partially recoverable (i.e., determination block 1218="No"), in block 1216 the enhanced HTTP server may send an error message without the file and in block 1224 the client device may receive the error message. As discussed above, if the enhanced HTTP server determines that the file requested is partially recoverable (i.e., determination block 1218="Yes"), in block 1220 the enhanced HTTP server may send a response including the incomplete version of a file and incomplete version of a file header.

In block 1222 the client device may receive the response including the incomplete version of a file and the incomplete version of a file header. In determination block 1308 the client device may determine whether the client device and/or any applications and/or clients running on the client device are incomplete version of a file handling enabled. As an example, a DASH client running on a smart phone may be capable of using incomplete versions of files, and the client device may therefore be incomplete version of a file handling enabled. In an embodiment, the client device may determine whether the file received in the response is an incomplete version of a file based on the incomplete version of a file header. If the client device determines that it is incomplete version of a file handling enabled (i.e., determination block 1308="Yes"), in block 1310 the client device may store the incomplete version of a file. As an example, the client device may store the incomplete version of a file in a memory cache for access by clients and/or applications running on the client device. If the client device determines that it is not incomplete version of a file handling enabled (i.e., determination block 1308="No"), in block 1312 the client device may discard the incomplete version of a file.

FIG. 14 illustrates an embodiment method 1400 similar to method 1300 described above with reference to FIG. 14, except that rather than sending a response with an incomplete version of a file header, the enhanced HTTP server may send an error message including the incomplete version of a file. In blocks 1302, 1304, 1212, and 1224 the client device may perform the operations of like number blocks of method 1300 described above with reference to FIG. 13 to generate and send a file request to the enhanced HTTP server and receive a response including the full file when available or an error message without any portion of the requested file when the file is not partially recoverable. In blocks 1306, 1208, 1210, 1218, and 1216 the enhance HTTP server may perform operations of like numbered blocks of method 1300 as described above with reference to FIG. 13 to receive the file request, determine whether the full requested file is available or partially recoverable, and send a response or error message accordingly.

If the enhanced HTTP server determines that the file requested is partially recoverable (i.e., determination block 1218="Yes"), in block 1402 the enhanced HTTP server may send an error message including an incomplete version of a file status code and the incomplete recoverable file. In an embodiment, the status code itself may indicate that at least a portion of the file identified in the file request is an incomplete version of a file. In an embodiment, the assigned number status code of the number may indicate the file included in the error message is an incomplete version of a file. The assigned number of the status code may be in the 400's, such as 499 to indicate it is associated with an error, for example a request for a file that is not fully available. The assigned number of the status code may be in a status code range that is undefined in current HTTP, such as the 600's, and the new status code range may by definition indicate an incomplete version of a file is being provided in response to a file request. In an embodiment, the incomplete version of a file included in the error message may comprise source symbols and repair symbols. In block 1404 the client device may receive the error message including the incomplete version of a file. The client device may determine the error message includes an incomplete version of a file based on the status code of the error message. In blocks 1308, 1310, and 1312 the client device may perform operations of like numbered blocks of method 1300 described above with reference to FIG. 13 to determine whether incomplete version of a file handling is enabled and store or discard the incomplete version of a file accordingly.

Figure 15:
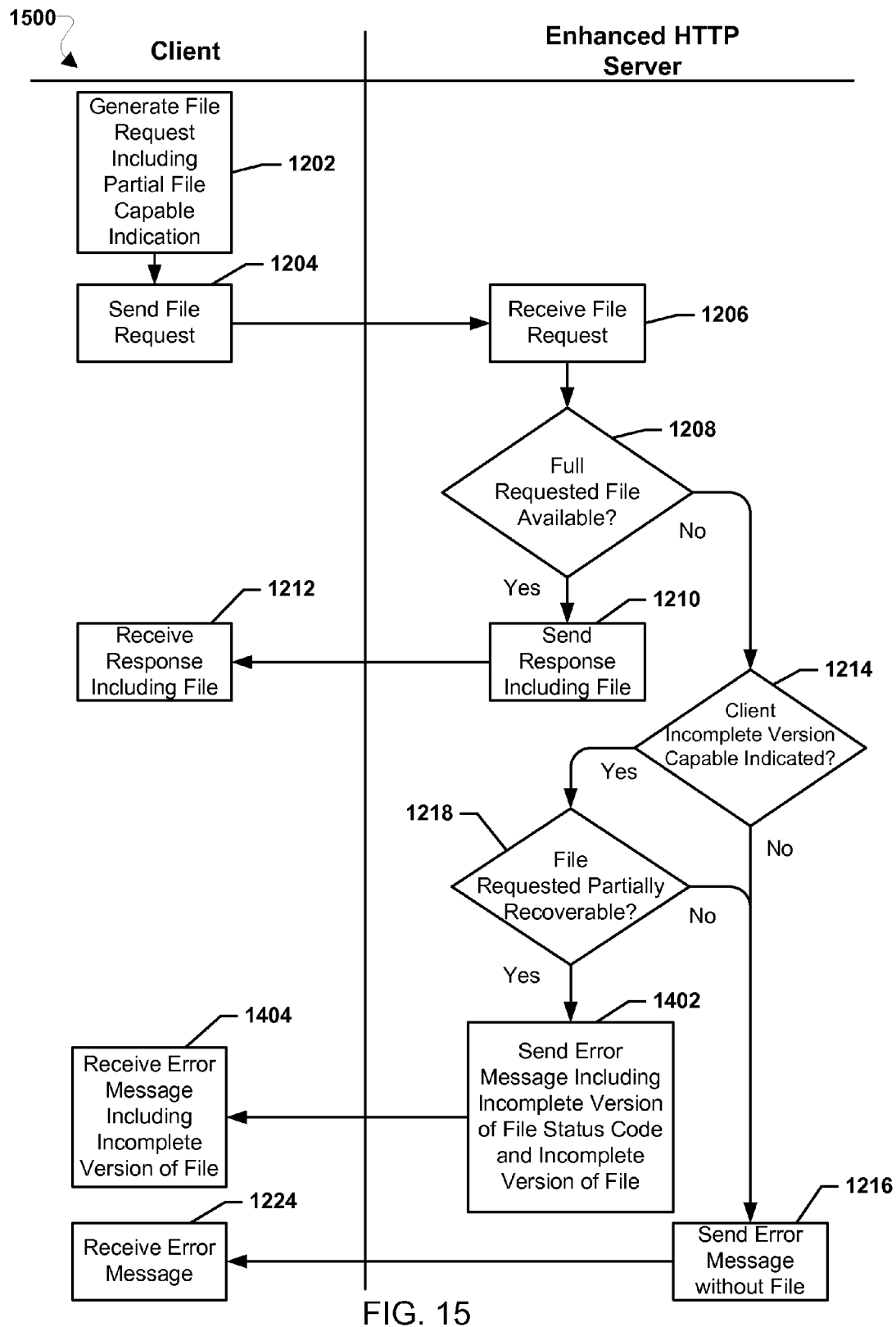
FIG. 15 is a process flow diagram illustrating a fourth embodiment method for enhanced HTTP server handling of client requests for incomplete versions of files.

FIG. 15 illustrates an embodiment method 1500 similar to method 1200 described above with reference to FIG. 12, except that rather than sending a response with an incomplete version of a file header, the enhanced HTTP server may send an error message including the incomplete version of a file. In blocks 1202, 1204, 1206, 1208, 1210, 1212, 1214, 1218, 1216, and 1224, the client device and enhance HTTP server, respectively, may perform operations of like numbered blocks of method 1200 described above with reference to FIG. 12. If the file requested is partially recoverable (i.e., determination block 1218="Yes"), as discussed above, in block 1402 the enhanced HTTP server may send an error message including an incomplete version of a file status code and the incomplete recoverable file. In an embodiment, the status code itself may indicate that at least a portion of the file identified in the file request is an incomplete version of a file. In an embodiment, the assigned number status code of the number may indicate the file included in the error message is an incomplete version of a file. The assigned number of the status code may be in the 400's, such as 499 to indicate it is associated with an error, for example a request for a file that is not fully available. The assigned number of the status code may be in a status code range that is undefined in current HTTP, such as the 600's, and the new status code range may by definition indicate an incomplete version of a file is being provided in response to a file request. In an embodiment, the incomplete version of a file included in the error message may comprise source symbols and repair symbols. As discussed above, in block 1404 the client device may receive the error message including the incomplete version of a file. The client device may determine the error message includes an incomplete version of a file based on the status code of the error message.

In an additional embodiment, FEC decoding may performed by the consuming client/application of the incomplete version of a file which comprises FEC symbols which is an incomplete subset of what was originally sent by the enhanced HTTP server. In an embodiment, the enhanced HTTP server may only be enabled to identify that a file it may provide is not complete, but may not be able to repair the incomplete version of a file or determine whether the incomplete version of a file is recoverable. Upon receiving the incomplete version of a file, the client may gather the available FEC symbols and determine whether the FEC symbols are sufficient to perform FEC decoding. Upon determining that the FEC symbols are insufficient to perform FEC decoding, the client may invoke a repair service, such as via the unicast network, to fetch additional FEC symbols to be used along with the ones obtained earlier to perform the FEC recovery.

In an embodiment, the mechanisms may pertain to the delivery of incomplete version of file content from the FLUTE receiver to a consuming application capable of handling such incomplete content, in support of different usage scenarios. In an embodiment, an incomplete content file may be passed by the FLUTE receiver to the application. Missing data in such incomplete version of a file may result from the occurrence of transmission errors which are uncorrectable by Application Layer (AL) FEC processing performed by the FLUTE receiver (if FEC encoding was applied by the FLUTE sender). The associated consuming application may be referred to in this case as Application-Type A. In an embodiment, AL FEC may be applied by the FLUTE sender, with subsequent FEC decoding performed by the consuming application instead of the FLUTE receiver. The content forwarded to the application may include source and/or repair encoding symbols (depending on the type of encoding symbols nominally sent on the broadcast bearer), along with FEC metadata (i.e. FEC Payload ID and FEC OTI elements). Should transmission errors result in the application receiving a (partial) set of source and repair data insufficient to facilitate successful FEC decoding, the application may utilize a repair service to obtain additional source or repair data over the unicast network. The associated consuming application may be referred to in this case as Application-Type B.

In an embodiment, incomplete version of a file delivery from the FLUTE receiver to the consuming application of Type A may utilize a single pair of request and response messages using the HTTP/1.1 protocol (RFC 2616[18]). Other delivery mechanisms/protocols for this interface may also be utilized. The application may use the conventional HTTP/1.1 GET or partial GET request to request delivery of the target file content from a standard HTTP/1.1 server function, the latter assumed to reside within the FLUTE receiver. This UE-based HTTP server entity may be abbreviated as HTTP-server$_{ue}$. The HTTP-server$_{ue}$ may deliver in the response message body the corresponding file data that it had previously received. As described below, special extension headers may be defined to indicate the capability of the requesting application to accept an incomplete resource relative to its nominal request, as well as the intent of the HTTP-server$_{ue}$ to deliver such incomplete resource in the response message body.

In an embodiment, an extension-header "Incomplete-Resource:" may be included in the HTTP request message to indicate the willingness/capability of the requesting application to handle incomplete resource returned in the response message. There may be no need for a value field for this extension header given the presence of the header itself fully defines the context. This extension header, of the entity-header type may correspond to a Permanent Message Header as defined in RFC 3864 entitled "Registration Procedures for Message Header Fields", published September 2004, available at http://www.ietf.org/rfc/rfc3864.txt.pdf, with the associated IANA registration information as given below. In the event the HTTP-server$_{ue}$ has available only a portion of the content corresponding to the requested resource, it may send in the response line the status code '404' (Not Found), and may include in the response message the same extension-header "Incomplete-Resource:". Similar to the case of its use in the request message, a value field may be unnecessary for this extension header since the presence of the header may be an indication of the server's intent to provide an incomplete resource in the response message.

In an embodiment, the Type A application may indicate in the HTTP GET request the target file being requested. For this purpose, the application may be assumed to have knowledge of the corresponding file URI (e.g. from the Schedule Description metadata fragment of the USD, the MPD, a Web page associated with the MBMS service, etc.). The extension-header "Reception-Capability:" may be included in the request message. An HTTP GET with a normal query may be used to request the sought data, according to HTTP1.1 defined in RFC 2616. Example schemas for such a request method in ABNF are shown below.

```
resource_request_http_URL = local_resource_URI "?" query
   local_resource_URI = <the URI known to the application,
representing the location within the local HTTP server from which the
target file content can be retrieved >
   query = std_query std_query = file_uri ["&" byte-ranges] ["&"
content_md5] file_uri = "fileURI=" URI-reference;
   byte-ranges = <one or more byte ranges within the requested
resource, as defined by the 'Range' request header in RFC 2616>
      content_md5 = "Content-MD5=" 1*(ALPHA / DIGIT / "+" / "/" /
      "=")
```

In an embodiment, the repair request may contain an indication of the MD5 hash value of the file, if present in the FDT instance declaring the file from which data may be being requested. The MD5 hash value may be used to identify a specific version of the file.

As an example, assume HTTP-server$_{ue}$ that in a MBMS download session a 3gp video file with URI="www.example.comm/olympics2012/swimming/race1.3gp" was delivered to the FLUTE receiver in the MBMS client. Also, it may be assumed that the application knows that the URI of the file/incomplete version of a file delivery service provided by the HTTP-server$_{ue}$ may be "http://localhost/path/file_resource/resource_56", and the MD5 value of that file may be "BKHjFSA5KuTeSQW2MBV587G==". After the MBMS download, it may be further assumed that the FLUTE receiver, upon performing FEC decoding (assuming FEC encoding was applied at the sending side), stores the recovered file content, which may be incomplete due to uncorrectable errors, for subsequent retrieval by the application. The application may then send an example HTTP GET request as follows:

```
GET
/path/file_resource/resource_56?fileURI=www.example.comm/olympics2
012/swimming/race1.3gp&Content-MD5=
BKHjFSA5KuTeSQW2MBV587G==HTTP/1.1
Host: localhost
Reception-Capability: incomplete-resource
```

In an embodiment, in conjunction with the '404' status code and extension-header "Incomplete-Resource:", the HTTP response message may include a message body for carrying the incomplete version of a file contents. The structure of the message body may be signaled according to the semantics of the '206' (Incomplete Content) status code as defined in RFC 2616 via various manners. In an embodiment, if the incomplete version of a file to be returned comprises a contiguous sequence of bytes that can be represented as a single range, the response may include the header field 'Content-Range' indicating the byte range included with this response. In an embodiment, if the incomplete version of a file to be returned comprises multiple but discontiguous sequences of bytes that can be represented as multiple byte ranges, the response may contain the header field 'Content-Type' with the value "multipart/byteranges". In addition, a 'Content-Range' field may appear in each part to indicate the byte range for that part. In an embodiment, the use of a single byte range or multiple byte ranges to convey the content of the message body, if a 'Content-Length' header may be also present in the response, its value may match the actual number of octets carried in the message body of the HTTP response message.

In an embodiment, incomplete version of a file delivery from the FLUTE receiver to the consuming application of Type B may be assumed to utilize request and response messages defined by the HTTP/1.1 protocol (RFC 2616). Other delivery mechanisms/protocols for this interface may be used. The application may use the conventional HTTP/1.1 GET request to request from a standard HTTP/1.1 server function associated with the FLUTE receiver, encoding symbols and FEC metadata associated with the target file. As discussed above, this UE-based HTTP server may be designated as the HTTP-server$_{ue}$. The HTTP-server$_{ue}$ then delivers via the response message body the corresponding set of encoding symbols it has available, along with the FEC metadata. The same extension headers as defined in 7.X.2 may be used to indicate the capability of the requesting application to accept an incomplete resource relative to its nominal request, and the intent of HTTP-server$_{ue}$ to deliver such incomplete resource.

In an embodiment, the Type B application may include in the HTTP GET request the URI of the file for which it may be requesting encoding symbols and FEC metadata. For this purpose, the application may be assumed to have knowledge of the corresponding file URI (e.g. from the Schedule Description metadata fragment of the USD, the MPD, a Web page associated with the MBMS service, etc.). The extension-header "Incomplete-Resource" as defined in above may be included in the request message.

In an embodiment, an HTTP GET with a normal query may be used to request the sought data, according to HTTP1.1 (RFC 2616). An example syntax used for such request method in ABNF is shown below.

```
resource_request_http_URL = local_resource_URI "?" query
   local_resource_URI = <the URI known to the application,
representing the location within the local HTTP server from which the
target FEC information can be retrieved >
   query = std_query
   std_query = file_uri ["&" content_md5]
   file_uri = "fileURI=" URI-reference;
   content_md5 = "Content-MD5=" 1*(ALPHA / DIGIT / "+" / "/" /
   "=")
```

In an embodiment, the incomplete version of a file request may contain an indication of the MD5 hash value of the file, if present in the FDT instance declaring the file from which data may be being requested. The MD5 hash value may be used to identify a specific version of the file.

As an example, assume that in a MBMS download session a music file with URI="www.example.comm/greatmusic/number1.aac" was delivered to the FLUTE receiver in the MBMS client. Also, it may be assumed that the application knows that the URI of the file/incomplete version of a file delivery service provided by the HTTP-server$_{ue}$ may be "http://localhost/path/fec_resource/resource_88", and the MD5 value of that file may be "ODZiYTU10TFkZGY2NWY50Dh==". After the MBMS download, it may be further assumed that the FLUTE receiver stores the received FEC encoding symbols, which may be incomplete due to transmission errors, and FEC metadata, for subsequent retrieval by the consuming application. The application may then send an example HTTP GET request as follows:

```
GET
/path/fec_resource/resource_88?fileURI=www.example.comm/greatmusic/numb
er1.aac &Content-MD5= ODZiYTU1OTFkZGY2NWY5ODh==  HTTP/1.1
Host: localhost
Reception-Resource:
```

In an embodiment, the overall mechanism and format of the incomplete version of a file response message may be similar to that defined for the symbol-based file repair response message for HTTP delivery of repair data, with differences as described below. In an embodiment, the incomplete version of a file response message consists of HTTP header and file repair response payload (HTTP payload). In an embodiment, assuming that some data loss may be detected by the FLUTE receiver, and the request message had included the extension header "Incomplete-Resource:", the HTTP response message may include: HTTP status code set to 200 OK, Message header fields containing at least: the (same) extension header "Incomplete-Resource:" to indicate incomplete content to be returned in the message body, Content type of the HTTP payload as indicated below, Message body carrying the FEC encoding and FEC metadata. The incomplete version of a file delivery response message format may include a status line, message headers, FEC-OTI elements, length indicators, FEC payload IDs, and encoding symbols. In an embodiment, FEC-OTI elements may be 14 bytes long, and may include FEC object transmission information comprising the concatenation of the encoded Common FEC Object transmission information and the encoded Scheme-Specific FEC Object Transmission information. In an embodiment, a length indicator may be 2 bytes and indicate the number of encoding symbols in the group (e.g., in network byte order, i.e., high order byte first). In an embodiment, an FEC payload ID may indicate which encoding symbols are included in the group. The format and interpretation of the FEC payload ID may depend on the FEC scheme in use. In an embodiment, the encoding symbols may contain the encoding symbols, and all the encoding symbols may be the same length. In an embodiment, the Content-Type may be set to "application/simpleSymbolContainer", which may indicate that the message body may be a simple container of encoding symbols. In an embodiment, an example HTTP status line and message headers, in the case of incomplete resource availability at the FLUTE receiver/HTTP-server$_{ue}$, may be as follows:

```
HTTP/1.1      200      OK
Content-Type: application/simpleSymbolContainer
Incomplete-Resource:
```

In an embodiment, encoding symbols may be included in the response in groups. Each group may be preceded by an indication of the number of symbols within the group and an FEC Payload ID coded according to the FEC scheme used for the original file delivery session. The FEC Payload ID identifies all the symbols in the group in the same way that the FEC Payload ID of an FEC source or repair packet identifies all the symbols in the packet. The file repair response payload may be constructed by including each FEC Payload ID and Encoding Symbol group one after another (these are already byte aligned). The order of these pairs in the repair response payload may be in order of increasing SBN, and then increasing ESI, value; however no particular order may be mandated.

In an embodiment, a single HTTP incomplete version of a file response message may contain, at most, the same number of symbols originally sent by the FEC encoder for transmission over the MBMS bearer. In an embodiment, the application may have sufficient information to calculate the length of each encoding symbol and each FEC Payload ID. All encoding symbols are the same length; with the possible exception of the last source encoding symbol in the repair response. All FEC Payload IDs are the same length for an incomplete version of a file request-response message pair, since a single FEC scheme may be used for a single file.

In an embodiment, a new HTTP extension header "Incomplete-Resource:" may be used by the HTTP client to indicate to the server its willingness and capability to accept an incomplete or incomplete resource relative to the identified resource in the HTTP-URL. The same extension header may be used by the HTTP server to indicate, to the client, its intent to deliver an incomplete resource in the response message body, when only such incomplete content may be available, and upon detecting the client's capability to handle such incomplete response. The procedures for registering header extensions in IANA's Permanent Message Header Field Registry are defined in RFC 3864.

Figure 16:
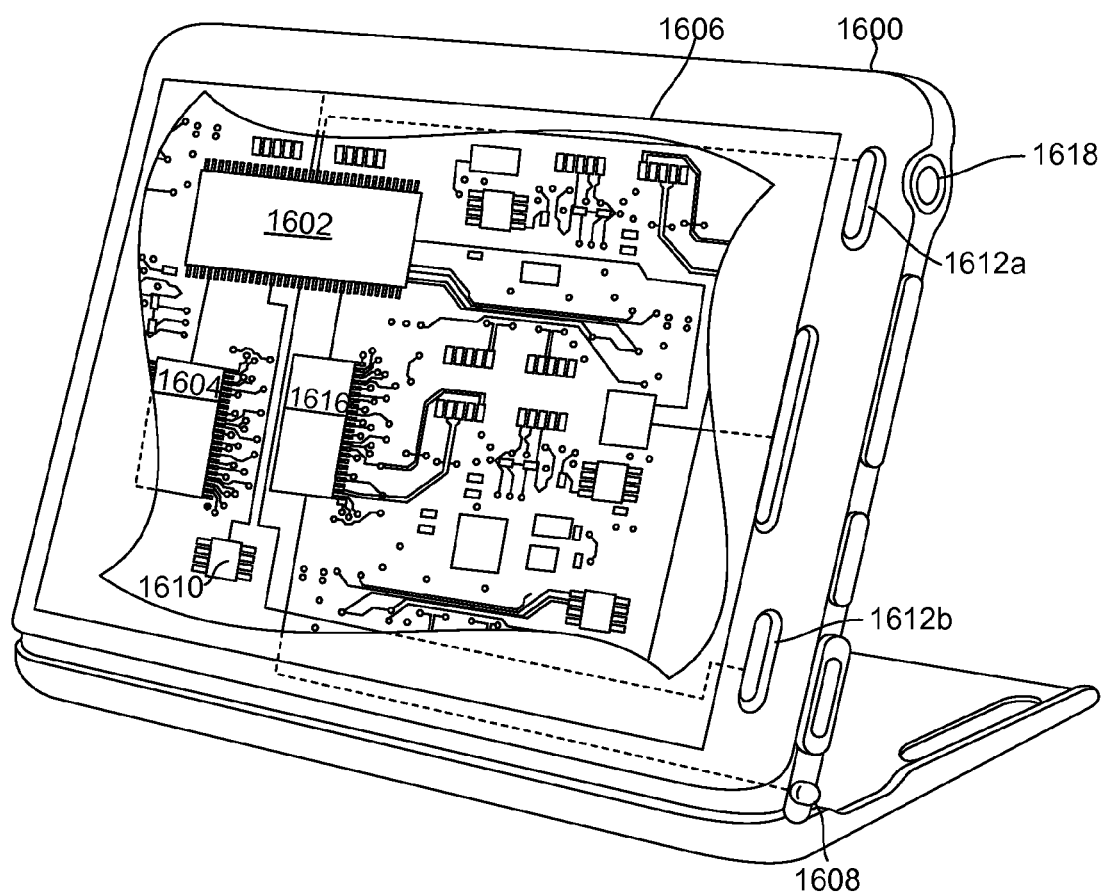
FIG. 16 is a component diagram of an example mobile device suitable for use with the various embodiments.

The various embodiments may be implemented in any of a variety of mobile devices, an example of which is illustrated in FIG. 16. For example, the mobile device 1600 may include a processor 1602 coupled to internal memories 1604 and 1610. Internal memories 1604 and 1610 may be volatile or non-volatile memories, and may also be secure and/or encrypted memories, or unsecure and/or unencrypted memories, or any combination thereof. The processor 1602 may also be coupled to a touch screen display 1606, such as a resistive-sensing touch screen, capacitive-sensing touch screen infrared sensing touch screen, or the like. Additionally, the display of the mobile device 1600 need not have touch screen capability. Additionally, the mobile device 1600 may have one or more antenna 1608 for sending and receiving electromagnetic radiation that may be connected to a wireless data link and/or cellular telephone transceiver 1616 coupled to the processor 1602. The mobile device 1600 may also include physical buttons 1612a and 1612b for receiving user inputs. The mobile device 1600 may also include a power button 1618 for turning the mobile device 1600 on and off.

Figure 17:
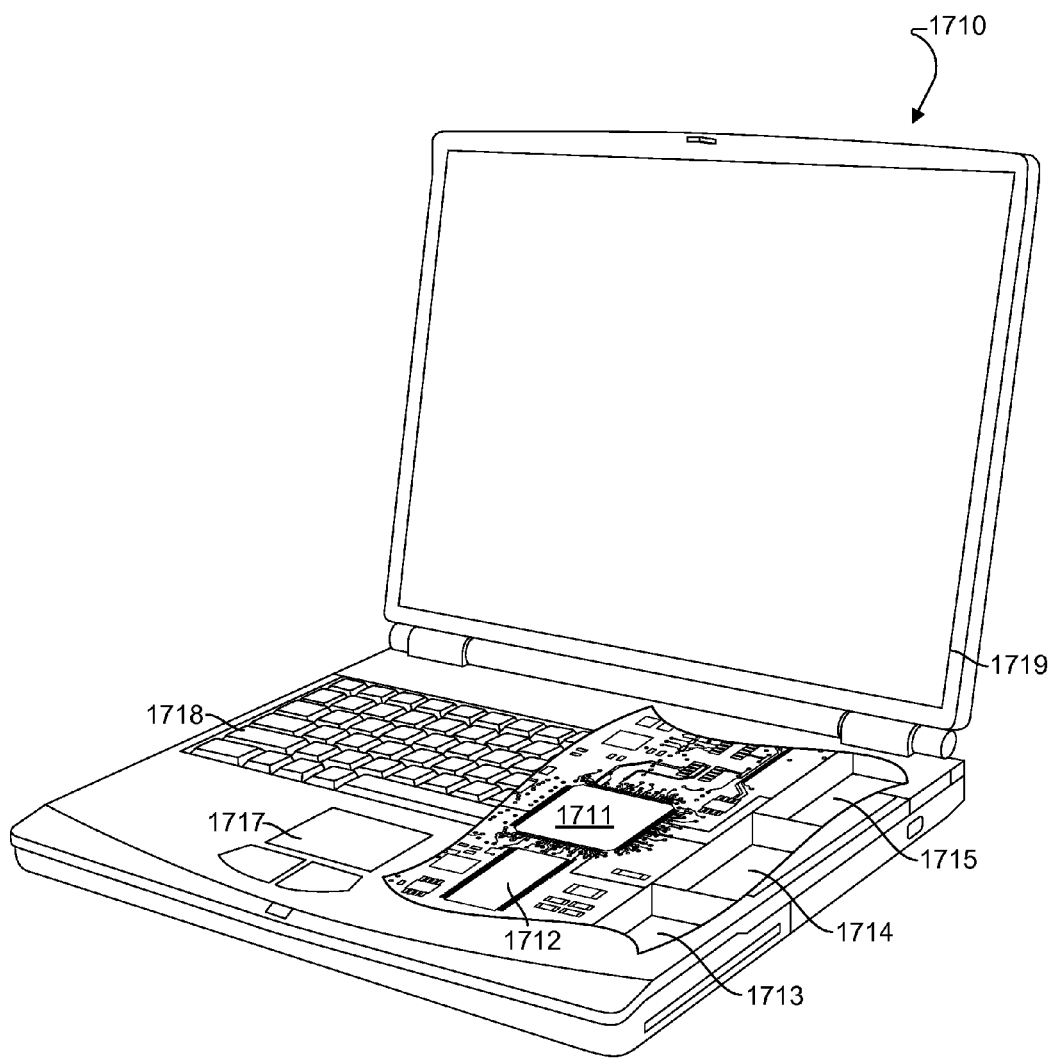
FIG. 17 is a component diagram of another example mobile device suitable for use with the various embodiments.

The various embodiments described above may also be implemented within a variety of personal computing devices, such as a laptop computer 1710 as illustrated in FIG. 17. Many laptop computers include a touch pad touch surface 1717 that serves as the computer's pointing device, and thus may receive drag, scroll, and flick gestures similar to those implemented on mobile computing devices equipped with a touch screen display and described above. A laptop computer 1710 will typically include a processor 1711 coupled to volatile memory 1712 and a large capacity nonvolatile memory, such as a disk drive 1713 of Flash memory. The computer 1710 may also include a floppy disc drive 1714 and a compact disc (CD) drive 1715 coupled to the processor 1711. The computer device 1710 may also include a number of connector ports coupled to the processor 1711 for establishing data connections or receiving external memory devices, such as a USB or FireWire® connector sockets, or other network connection circuits for coupling the processor 1711 to a network. In a notebook configuration, the computer housing includes the touchpad 1717, the keyboard 1718, and the display 1719 all coupled to the processor 1711. Other configurations of the computing device may include a computer mouse or trackball coupled to the processor (e.g., via a USB input) as are well known, which may also be use in conjunction with the various embodiments.

Figure 18:
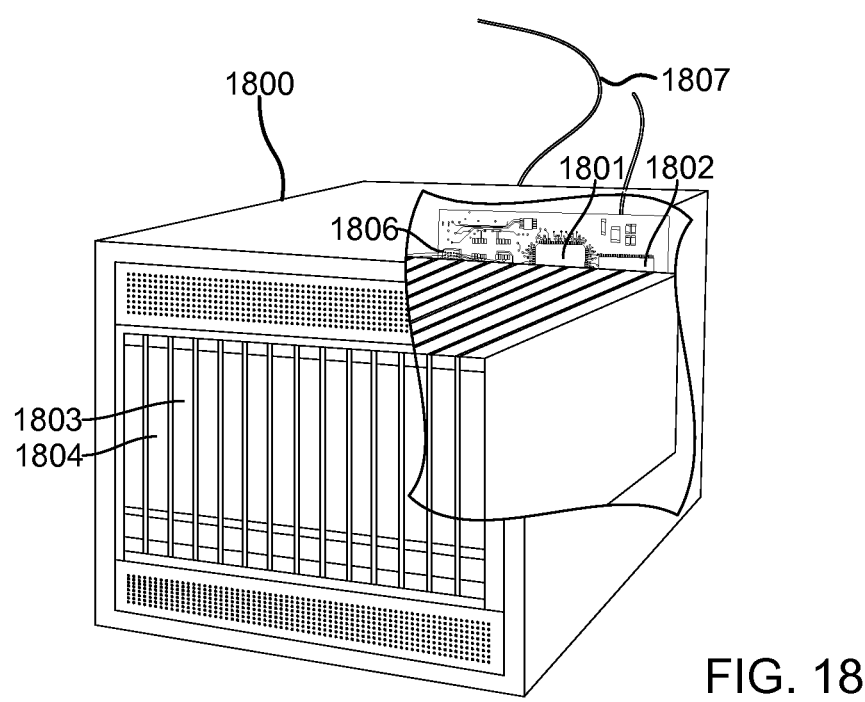
FIG. 18 is a component diagram of an example server suitable for use with the various embodiments

The various embodiments may also be implemented on any of a variety of commercially available server devices, such as the server 1800 illustrated in FIG. 18. Such a server 1800 typically includes a processor 1801 coupled to volatile memory 1802 and a large capacity nonvolatile memory, such as a disk drive 1803. The server 1800 may also include a floppy disc drive, compact disc (CD) or DVD disc drive 1804 coupled to the processor 1801. The server 1800 may also include network access ports 1806 coupled to the processor 1801 for establishing network interface connections with a network 1807, such as a local area network coupled to other broadcast system computers and servers.

The processors 1602, 1711, and 1801 may be any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Typically, software applications may be stored in the internal memory 1604, 1610, 1712, 1713, 1802, and 1803 before they are accessed and loaded into the processors 1602, 1711, and 1801. The processors 1602, 1711, and 1801 may include internal memory sufficient to store the application software instructions. In many devices the internal memory may be a volatile or nonvolatile memory, such as flash memory, or a mixture of both. For the purposes of this description, a general reference to memory refers to memory accessible by the processors 1602, 1711, and 1801 including internal memory or removable memory plugged into the device and memory within the processor 1602, 1711, and 1801 themselves.

The foregoing method descriptions and the process flow diagrams are provided merely as illustrative examples and are not intended to require or imply that the steps of the various embodiments must be performed in the order presented. As will be appreciated by one of skill in the art the order of steps in the foregoing embodiments may be performed in any order. Words such as "thereafter," "then," "next," etc. are not intended to limit the order of the steps; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The hardware used to implement the various illustrative logics, logical blocks, modules, and circuits described in connection with the aspects disclosed herein may be implemented or performed with a general purpose processor configured with processor-executable instructions, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some steps or methods may be performed by circuitry that is specific to a given function.

In one or more exemplary aspects, the functions described may be implemented in hardware, software, firmware, or any combination thereof. If implemented in software, the functions may be stored on or transmitted over as one or more instructions or code on a non-transitory computer-readable or processor-readable storage medium. The steps of a method or algorithm disclosed herein may be embodied in a processor-executable software module which may reside on a tangible, non-transitory processor-readable storage medium. Tangible, non-transitory processor-readable storage media may be any available media which may be accessed by a processor of a computing device. By way of example, and not limitation, such non-transitory processor-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a processor. Disk and disc, as used herein, includes compact disc (CD), laser disc, optical disc, digital versatile disc (DVD), floppy disk, and blu-ray disc, where disks usually reproduce data magnetically, while discs reproduce data optically with lasers. Combinations of the above should also be included within the scope of non-transitory processor-readable media. Additionally, the operations of a method or algorithm may reside as one or any combination or set of codes and/or instructions on a tangible, non-transitory machine-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method for delivering an incomplete response from a Hypertext Transfer Protocol (HTTP) server to a client, comprising:

receiving a file request in the HTTP server from the client for a file or a byte range of the file at the HTTP server, wherein the file request indicates whether the client is capable of using an incomplete response;

determining in the HTTP server, based on the file request, whether the client is capable of using an incomplete response; and sending from the HTTP server to the client an incomplete response in response to determining that the client is capable of using an incomplete response if a full response including an entirety of the file or the byte range of the file is not available at the HTTP server and the file or the byte range of the file requested by the file request is partially available at the HTTP server;

the incomplete response sent from the HTTP server including the partially available file or the partially available byte range of the file requested by the file request and a header indicating the file or the byte range of the file requested by the file request is partially available or a status code indicating the file or the byte range of the file requested by the file request is partially available.

2. The method of claim 1, wherein:
the file request includes a file request header;
the file request header indicates whether the client is capable of using an incomplete response; and
determining in the HTTP server, based on the file request, whether the client is capable of using an incomplete response comprises determining in the HTTP server, based on the file request header, whether the client is capable of using an incomplete response.

3. The method of claim 1, wherein:
the file request includes a Uniform Resource Locator (URL);
the URL indicates that the client is capable of using an incomplete response; and
determining in the HTTP server, based on the file request, whether the client is capable of using an incomplete response comprises determining in the HTTP server, based on the URL, whether the client is capable of using an incomplete response.

4. The method of claim 1, further comprising:
sending the file request to the HTTP server from the client;
receiving from the HTTP server the incomplete response; and
rendering content using the incomplete response.

5. The method of claim 1, wherein:
the file request includes a first byte range request and a redundant second byte range request; and
determining in the HTTP server, based on the file request, whether the client is capable of using an incomplete response comprises determining in the HTTP server, based on the redundant second byte range request, whether the client is capable of using an incomplete response.

6. A Hypertext Transfer Protocol (HTTP) server, comprising:
means for receiving a file request from a client for a file or a byte range of the file at the HTTP server, wherein the file request indicates whether the client is capable of using an incomplete response;
means for determining, based on the file request, whether the client is capable of using an incomplete response; and
means for sending from the HTTP server to the client an incomplete response in response to determining that the client is capable of using an incomplete response if a full response including an entirety of the file or the byte range of the file is not available at the HTTP server the file or the byte range of the file requested by the file request is partially available at the HTTP server;

the incomplete response sent from the HTTP server including the partially available file or the partially available byte range of the file requested by the file request and a header indicating the file or the byte range of the file requested by the file request is partially available or a status code indicating the file or the byte range of the file requested by the file request is partially available.

7. The HTTP server of claim 6, wherein:
the file request includes a file request header;
the file request header indicates whether the client is capable of using an incomplete response; and
means for determining, based on the file request, whether the client is capable of using an incomplete response comprises means for determining, based on the file request header, whether the client is capable of using an incomplete response.

8. The HTTP server of claim 6, wherein:
the file request includes a Uniform Resource Locator (URL);
the URL indicates that the client is capable of using an incomplete response; and
means for determining, based on the file request, whether the client is capable of using an incomplete response comprises means for determining, based on the URL, whether the client is capable of using an incomplete response.

9. The HTTP server of claim 6, wherein:
the file request includes a first byte range request and a redundant second byte range request; and
means for determining, based on the file request, whether the client is capable of using an incomplete response comprises means for determining, based on the redundant second byte range request, whether the client is capable of using an incomplete response.

10. A Hypertext Transfer Protocol (HTTP) server, comprising:
a processor configured with processor-executable instructions to perform operations comprising:
receiving a file request from a client for a file or a byte range of the file at the HTTP server, wherein the file request indicates whether the client is capable of using an incomplete response;
determining, based on the file request, whether the client is capable of using an incomplete response; and
sending from the HTTP server to the client an incomplete response in response to determining that the client is capable of using an incomplete response if a full response including an entirety of the file or the byte range of the file is not available at the HTTP server and the file or the byte range of the file requested by the file request is partially available at the HTTP server;
the incomplete response sent from the HTTP server including the partially available file or the partially available byte range of the file requested by the file request and a header indicating the file or the byte range of the file requested by the file request is partially available or a status code indicating the file or the byte range of the file requested by the file request is partially available.

11. The HTTP server of claim 10, wherein the processor is configured with processor-executable instructions to perform operations such that:
the file request includes a file request header;
the file request header indicates whether the client is capable of using an incomplete response; and determining, based on the file request, whether the client is capable of using an incomplete response comprises determining, based on the file request header, whether the client is capable of using an incomplete response.

12. The HTTP server of claim 10, wherein the processor is configured with processor-executable instructions to perform operations such that:
   the file request includes a Uniform Resource Locator (URL);
   the URL indicates that the client is capable of using an incomplete response; and
   determining, based on the file request, whether the client is capable of using an incomplete response comprises determining, based on the URL, whether the client is capable of using an incomplete response.

13. The HTTP server of claim 10, wherein the processor is configured with processor-executable instructions to perform operations such that:
   the file request includes a first byte range request and a redundant second byte range request; and
   determining, based on the file request, whether the client is capable of using an incomplete response comprises determining, based on the redundant second byte range request, whether the client is capable of using an incomplete response.

14. A non-transitory processor-readable storage medium having stored thereon processor-executable instructions configured to cause a Hypertext Transfer Protocol (HTTP) server to perform operations comprising:
   receiving a file request from a client for a file or a byte range of the file at the HTTP server, wherein the file request indicates whether the client is capable of using an incomplete response;
   determining, based on the file request, whether the client is capable of using an incomplete response; and
   sending to the client an incomplete response in response to determining that the client is capable of using an incomplete response if a full response including an entirety of the file or the byte range of the file is not available at the HTTP server and the file or the byte range of the file requested by the file request is partially available at the HTTP server;
   the incomplete response sent from the HTTP server including the partially available file or the partially available byte range of the file requested by the file request and a header indicating the file or the byte range of the file requested by the file request is partially available or a status code indicating the file or the byte range of the file requested by the file request is partially available.

15. The non-transitory processor-readable storage medium of claim 14, wherein the stored processor-executable instructions are configured to cause a HTTP server to perform operations such that:
   the file request includes a file request header;
   the file request header indicates whether the client is capable of using an incomplete response; and
   determining, based on the file request, whether the client is capable of using an incomplete response comprises determining, based on the file request header, whether the client is capable of using an incomplete response.

16. The non-transitory processor-readable storage medium of claim 14, wherein the stored processor-executable instructions are configured to cause a HTTP server to perform operations such that:
   the file request includes a Uniform Resource Locator (URL);
   the URL indicates that the client is capable of using an incomplete response; and
   determining, based on the file request, whether the client is capable of using an incomplete response comprises determining, based on the URL, whether the client is capable of using an incomplete response.

17. The non-transitory processor-readable storage medium of claim 14, wherein the stored processor-executable instructions are configured to cause a HTTP server to perform operations such that:
   the file request includes a first byte range request and a redundant second byte range request; and
   determining in the HTTP server, based on the file request, whether the client is capable of using an incomplete response comprises determining, based on the redundant second byte range request, whether the client is capable of using an incomplete response.

18. A receiver device, comprising:
   means for sending a file request to a Hypertext Transfer Protocol (HTTP) server for a file or a byte range of the file at the HTTP server, wherein the file request indicates the client is capable of using an incomplete response; and
   means for receiving from the HTTP server an incomplete response in response to the HTTP server determining that the client is capable of using an incomplete response if a full response including an entirety of the file or the byte range of the file is not available at the HTTP server and the file or the byte range of the file requested by the file request is partially available at the HTTP server;
   the incomplete response sent from the HTTP server including the partially available file or the partially available byte range of the file requested by the file request and a header indicating the file or the byte range of the file requested by the file request is partially available or a status code indicating the file or the byte range of the file requested by the file request is partially available.

19. The receiver device of claim 18, wherein:
   the file request includes a file request header; and
   the file request header indicates the client is capable of using an incomplete response.

20. The receiver device of claim 18, wherein:
   the file request includes a Uniform Resource Locator (URL); and
   the URL indicates that the client is capable of using an incomplete response.

21. The receiver device of claim 18, further comprising means for rendering content using the incomplete response.

22. The receiver device of claim 18, wherein the file request includes a first byte range request and a redundant second byte range request, the redundant second byte range indicating that the client is capable of using an incomplete response.

23. A receiver device, comprising:
   a processor configured with processor-executable instructions such that a client operating on the receiver device performs operations comprising:
      sending a file request to a Hypertext Transfer Protocol (HTTP) server for a file or a byte range of the file at the HTTP server, wherein the file request indicates the client is capable of using an incomplete response; and
      receiving from the HTTP server an incomplete response in response to the HTTP server determining that the client is capable of using an incomplete response if a full response including an entirety of the file or the byte range of the file is not available at the HTTP server and the file or the byte range of the file requested by the file request is partially available at the HTTP server;

the incomplete response sent from the HTTP server including a the partially available file or the partially available byte range of the file requested by the file request and a header indicating the file or the byte range of the file requested by the file request is partially available or a status code indicating the file or the byte range of the file requested by the file request is partially available.

24. The receiver device of claim 23, wherein the processor is configured with processor-executable instructions such that the client operating on the receiver device performs operations such that:

the file request includes a file request header; and
the file request header indicates the client is capable of using an incomplete response.

25. The receiver device of claim 23, wherein the processor is configured with processor-executable instructions such that the client operating on the receiver device performs operations such that:

the file request includes a Uniform Resource Locator (URL); and
the URL indicates that the client is capable of using an incomplete response.

26. The receiver device of claim 23, wherein the processor is configured with processor-executable instructions such that the client operating on the receiver device performs operations further comprising rendering content using the incomplete response.

27. The receiver device of claim 23, wherein the processor is configured with processor-executable instructions such that the client operating on the receiver device performs operations such that the file request includes a first byte range request and a redundant second byte range request, the redundant second byte range indicating that the client is capable of using an incomplete response.

28. A non-transitory processor-readable storage medium having stored thereon processor-executable instructions configured to cause a client operating on a receiver device processor to perform operations comprising:

sending a file request to a Hypertext Transfer Protocol (HTTP) server for a file or a byte range of the file at the HTTP server, wherein the file request indicates the client is capable of using an incomplete response; and receiving from the HTTP server an incomplete response in response to the HTTP server determining that the client is capable of using an incomplete response if a full response including an entirety of the file or the byte range of the file is not available at the HTTP server and the file or the byte range of the file requested by the file request is partially available at the HTTP server;

the incomplete response sent from the HTTP server including the partially available file or the partially available byte range of the file requested by the file request and a header indicating the file or the byte range of the file requested by the file request is partially available or a status code indicating the file or the byte range of the file requested by the file request is partially available.

29. The non-transitory processor-readable storage medium of claim 28, wherein the stored processor-executable instructions are configured to cause a client operating on a receiver device to perform operations such that:

the file request includes a file request header; and
the file request header indicates the client is capable of using an incomplete response.

30. The non-transitory processor-readable storage medium of claim 28, wherein the stored processor-executable instructions are configured to cause a client operating on a receiver device to perform operations such that:

the file request includes a Uniform Resource Locator (URL); and
the URL indicates that the client is capable of using an incomplete response.

31. The non-transitory processor-readable storage medium of claim 28, wherein the stored processor-executable instructions are configured to cause a client operating on a receiver device to perform operations further comprising rendering content using the incomplete response.

32. The non-transitory processor-readable storage medium of claim 28, wherein the stored processor-executable instructions are configured to cause a client operating on a receiver device to perform operations such that the file request includes a first byte range request and a redundant second byte range request, the redundant second byte range indicating that the client is capable of using an incomplete response.

* * * * *